(12) United States Patent
Kwon et al.

(10) Patent No.: US 12,088,653 B2
(45) Date of Patent: Sep. 10, 2024

(54) METHOD AND APPARATUS FOR PROCESSING MULTICAST SIGNAL

(71) Applicant: LG ELECTRONICS INC., Seoul (KR)

(72) Inventors: Woosuk Kwon, Seoul (KR); Joonhee Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/010,748

(22) PCT Filed: Jun. 24, 2021

(86) PCT No.: PCT/KR2021/007942
§ 371 (c)(1),
(2) Date: Dec. 15, 2022

(87) PCT Pub. No.: WO2022/005102
PCT Pub. Date: Jan. 6, 2022

(65) Prior Publication Data
US 2023/0275949 A1 Aug. 31, 2023

(30) Foreign Application Priority Data

Jun. 30, 2020 (KR) .................. 10-2020-0080630
Aug. 11, 2020 (KR) .................. 10-2020-0100371

(51) Int. Cl.
*H04L 65/752* (2022.01)
*H04L 65/611* (2022.01)

(52) U.S. Cl.
CPC .......... *H04L 65/752* (2022.05); *H04L 65/611* (2022.05)

(58) Field of Classification Search
CPC . H04L 65/752; H04L 65/611; H04L 12/1836; H04L 65/1069; H04L 65/612; H04L 65/762; H04L 65/80; H04L 12/1886
See application file for complete search history.

(56) References Cited

U.S. PATENT DOCUMENTS 7,986,702 B1 *  7/2011  Reister .................. H04H 60/82
                                                    725/38
2007/0168523 A1 *  7/2007  Jiang .................. H04L 65/1101
                                                    709/228

(Continued)

FOREIGN PATENT DOCUMENTS

KR  10-2008-0085841     9/2008
KR  10-2014-0049353     4/2014

(Continued)

OTHER PUBLICATIONS

Zong, "Multicast service switching method and apparatus", Nov. 11, 2021, WO-2021223745-A1, English Translation, Fig.1. (Year: 2021).*

(Continued)

*Primary Examiner* — Austin J Moreau
*Assistant Examiner* — Chhian (Amy) Ling
(74) *Attorney, Agent, or Firm* — Bryan Cave Leighton Paisner LLP

(57) ABSTRACT

A media processing apparatus according to embodiments comprises: a memory; and a processor connected to the memory, wherein the processor may be configured to receive media on the basis of a session comprising multicast and unicast, receive multicast server configuration information for the media, receive multicast gateway configuration information for the media, and control the media. A media processing method according to embodiments may comprise the steps of: receiving media on the basis of a session comprising multicast and unicast; receiving multicast server (Continued)

| Element or attribute name | | | | Use | Data type | Description |
|---|---|---|---|---|---|---|
| MulticastSession | | | | | | |
| | @serviceIdentifier | | | 1 | URI string | Service identifier for the logical service with which this session is associated. |
| | @contentPlaybackAvailabilityOffset | | | 0..1 | Duration string | Availability time offset adjustment applied to the original presentation manifest when passed to instances of the Content playback function. |
| | @sessionConversionStartTime | | | 0..1 | dateTime | Start time of unicast transport for this service. And multicast session will be terminated |
| | PresentationManifestLocator | | | 1..n | URI string | URL of a presentation manifest for the linear service. |
| | | @manifestId | | 1 | Name Token string | Uniquely identifies this presentation manifest within the scope of a multicast session. |
| | | @contentType | | 1 | MPEG-7 mimeType | The MIME content type of this presentation manifest. |
| | MulticastGatewaySessionReporting | | | 0..1 | | Container for multicast session reporting parameters. |
| | | ReportingLocator | | 1..n | URI String | Container for a multicast gateway reporting endpoint. |
| | | | @proportion | 0..1 | Decimal | Proportion of Multicast gateway instances that should send session reports to the specified endpoint. |
| | | | @period | 1 | Duration string | Session reporting periodicity. |
| | | | @randomDelay | 1 | Unsigned Integer | An additional random period that a Multicast gateway should delay between sending session reports. |
| | MulticastGateway | | | 0..n | | Container for multicast transport session parameters. | configuration information for the media; receiving multicast gateway configuration information about the media; and controlling the media.

14 Claims, 34 Drawing Sheets

(56) References Cited

U.S. PATENT DOCUMENTS

| | | | | |
|---|---|---|---|---|
| 2011/0122873 | A1* | 5/2011 | Bijwaard | H04L 12/1877 370/390 |
| 2016/0173547 | A1* | 6/2016 | Nortz | H04L 12/1881 709/219 |
| 2016/0323348 | A1* | 11/2016 | Bradbury | H04L 65/611 |
| 2018/0248806 | A1* | 8/2018 | Burnley | H04L 1/0002 |
| 2019/0238937 | A1* | 8/2019 | Lo | H04N 21/25866 |
| 2020/0029101 | A1* | 1/2020 | Salinger | H04N 21/25841 |
| 2021/0314631 | A1* | 10/2021 | Bâle | H04L 65/611 |
| 2022/0295155 | A1* | 9/2022 | Fujiwara | H04L 65/65 |

FOREIGN PATENT DOCUMENTS

| | | | | |
|---|---|---|---|---|
| WO | WO 2015096718 | * | 12/2014 | H04W 4/08 |
| WO | WO-2021223745 A1 | * | 11/2021 | H04W 36/00 |

OTHER PUBLICATIONS

Nelson, David M., "Smooth Streaming Deployment Guide", Microsoft Corporation, Aug. 2010, pp. 1-66.

3rd Generation Partnership Project; Technical Specification Group Services and System Aspects; Study on architectural enhancements for 5G multicast-broadcast services (Release 17), 3GPP TR 23.757, V0.4.0, Jun. 22, 2020.

Ai-Dubai, Ahmed Y. et al., "QoS-Aware Inter-domain Multicast for Scalable Wireless Community Networks" Sep. 2014. pp. 1-13.

* cited by examiner

FIG. 7

| Element or attribute name | Use | Data type | Description |
|---|---|---|---|
| MulticastServerConfiguration | | | Root element of the multicast server configuration instance document. |
| @validityPeriod | 0..1 | Duration | Time period after receipt for which this instance document is valid. If this attribute is present, then @validUntil should not be present. |
| @validUntil | 0..1 | dateTime | Deadline after which this instance document ceases to be valid. If this attribute is present, then @validityPeriod should not be present |
| @readyToSessionConversion | 0..1 | Boolean | Indicator that unicast session is ready |
| MulticastGatewayConfigurationTransportSession | 0..n | | Container for multicast gateway configuration transport session parameters. |
| MulticastSession | 0..n | | Container for multicast session parameters. |
| UnicastSession | 0..n | | Container for unicast session parameters. |

FIG. 8

| Element or attribute name | Use | Data type | Description |
|---|---|---|---|
| MulticastGatewayConfiguration | | | Root element of the multicast gateway configuration instance document. |
| @validityPeriod | 0..1 | Duration | Time period after receipt for which this instance document is valid. If this attribute is present, then @validUntil should not be present. If the Multicast gateway has received the multicast gateway configuration via a cached resource and this attribute is present, then the value must be reduced to by the cache age. |
| @validUntil | 0..1 | dateTime | Deadline after which this instance document ceases to be valid. If this attribute is present, then @validityPeriod should not be present. |
| @readyToSessionConversion | 0..1 | Boolean | Indicator that unicast session is ready |
| MulticastGatewayConfigurationTransportSession | 0..n | | Container for multicast gateway configuration transport session parameters. |
| MulticastSession | 0..n | | Container for multicast session parameters. |

FIG. 9

| Element or attribute name | | | Use | Data type | Description |
|---|---|---|---|---|---|
| MulticastSession | | | | | |
| | @serviceIdentifier | | 1 | URI string | Service identifier for the logical service with which this session is associated. |
| | @contentPlayback AvailabilityOffset | | 0..1 | Duration string | Availability time offset adjustment applied to the original presentation manifest when passed to instances of the Content playback function. |
| | @sessionConversionStartTime | | 0..1 | dateTime | Start time of unicast transport for this service. And multicast session will be terminated |
| | PresentationManifestLocator | | 1..n | URI string | URL of a presentation manifest for the linear service. |
| | | @manifestId | 1 | Name Token string | Uniquely identifies this presentation manifest within the scope of a multicast session. |
| | | @contentType | 1 | MPEG-7 mimeType | The MIME content type of this presentation manifest. |
| | MulticastGateway SessionReporting | | 0..1 | | Container for multicast session reporting parameters. |
| | | ReportingLocator | 1..n | URI String | Container for a multicast gateway reporting endpoint. |
| | | @proportion | 0..1 | Decimal | Proportion of Multicast gateway instances that should send session reports to the specified endpoint. |
| | | @period | 1 | Duration string | Session reporting periodicity. |
| | | @randomDelay | 1 | Unsigned Integer | An additional random period that a Multicast gateway should delay between sending session reports. |
| | MulticastGateway | | 0..n | | Container for multicast transport session parameters. |

FIG. 10

| Element or attribute name | | Use | Data type | Description |
|---|---|---|---|---|
| UnicastSession | | | | |
| | @serviceIdentifier | 1 | URI string | Service identifier for the logical service with which this session is associated. |
| | @contentPlaybackAvailabilityOffset | 0..1 | Duration string | Availability time offset adjustment applied to the original presentation manifest when passed to instances of the Content playback function. |
| | UnicastPresentationManifestLocator | 1..n | URI string | URL of a presentation manifest for the linear service which delivered in unicast session. |
| | @manifestId | 1 | Name Token string | Uniquely identifies this presentation manifest within the scope of a multicast session. |
| | @contentType | 1 | MPEG-7 mimeType | The MIME content type of this presentation manifest. |
| | MulticastGatewayUnicastSessionReporting | 0..1 | | Container for unicast session reporting parameters. |
| | ReportingLocator | 1..n | URI String | Container for a multicast gateway reporting endpoint. |
| | @proportion | 0..1 | Decimal | Proportion of Multicast gateway instances that should send session reports to the specified endpoint. |
| | @period | 1 | Duration string | Session reporting periodicity. |
| | @randomDelay | 1 | Unsigned Integer | An additional random period that a Multicast gateway should delay between sending session reports. |

FIG. 26

| URL element | | Use | Data type | Description |
|---|---|---|---|---|
| Host | | 1 | String | The FQDN (or the IP address) and optionally the port number of the Multicast rendezvous service. |
| ManifestPath | | 1 | String | The resource path for retrieving the presentation manifest from the specified host. |
| field | | 0..n | | |
| | AToken | 0..1 | String | The value is an authentication token that authorises access to the Multicast rendezvous service, if required by the system operator. This may have been included in the original presentation manifest URL, it may have been added by a third-party CDN broker as part of an earlier HTTP redirect URL, or it may be generated locally by the Application. |
| | MGstatus | 0..1 | Integer | The value is the current status of the Multicast gateway.<br>0 = inactive<br>1 = active |
| | MGid | 0..1 | String | The value is the port number of the Multicast gateway, optionally preceded by its IP address. The format shall be [IP address]:port. |
| | MGhost | 0..1 | String | The value is the Multicast gateway host name. |
| | Ori | 0..1 | String | The format shall be [IP address]:port.<br>The value is the host name (FQDN) of the original targeted host. the Application may substitute the original targeted host name (FQDN) with the local Multicast rendezvous service host name or address. Moreover, in case of relying on a third-party CDN broker, the latter indicates here the original targeted host name (FQDN) before redirecting the request to the Multicast rendezvous service. |

FIG. 27

| URL element | Use | Data type | Description |
|---|---|---|---|
| Host | 1 | String | The IP address or FQDN of the Multicast gateway and optionally the port number (for example "router.example:8088" or "192.0.2.1:8088"). |
| Session ID | 0..1 | String | A unique presentation session identifier communicated (and possibly generated) by the Multicast rendezvous service comprising one or more URL path elements. |
| ManifestPath | 1 | String | The resource path for retrieving the presentation manifest from the specified host. |
| conf | 0..1 | String | The multicast session parameters shall take the form of a multicast gateway configuration instance document comprising one multicast session. The document shall be compressed using Gzip and base64url-encoded prior to inclusion as a URL query string parameter. |

FIG. 30

| URL element | Use | Data type | Description |
|---|---|---|---|
| Host | 1 | String | The IP address or FQDN of the Content hosting and optionally the port number (for example "CDN.example:8088" or "192.0.2.1:8088"). |
| Session ID | 0..1 | String | A unique presentation session identifier communicated (and possibly generated) by the Multicast rendezvous service comprising one or more URL path elements. |
| ManifestPath | 1 | String | The resource path for retrieving the presentation manifest from the specified host. |

FIG. 33

| URL element | | Use | Data type | Description |
|---|---|---|---|---|
| Host | | 1 | String | The FQDN (or the IP address) and optionally the port number of the Multicast rendezvous service. |
| ManifestPath | | 1 | String | The resource path for retrieving the presentation manifest from the specified host. |
| field | RequestOption | 0..n | Integer | The value is the reason of the current request.<br>0 = initial request<br>1 = Multicast to Unicast conversion |
| | ServiceID | 0..1 | String | The value is the service ID which delivered from Multicast gateway.<br>This field is appeared when the RequestOption is set to '1' |
| | MulticastTransport SessionID | 0..1 | String | The value is the Multicast transport session ID which delivered from Multicast gateway.<br>This field is appeared when the RequestOption is set to '1'. |
| | AToken | 0..1 | String | The value is an authentication token that authorises access to the Multicast rendezvous service, if required by the system operator. This may have been included in the original presentation manifest URL, it may have been added by a third-party CDN broker as part of an earlier HTTP redirect URL, or it may be generated locally by the Application. |
| | MGstatus | 0..1 | Integer | The value is the current status of the Multicast gateway.<br>0 = inactive<br>1 = active |
| | MGid | 0..1 | String | If the value of RequestOption is '1', the value of MGstatus should be set to '0'<br>The value is the port number of the Multicast gateway, optionally preceded by its IP address.<br>The format shall be [IP address]:port. |
| | MGhost | 0..1 | String | The value is the Multicast gateway host name. |
| | Ori | 0..1 | String | The value is the host name (FQDN) of the original targeted host. the Application may substitute the original targeted host name (FQDN) with the local Multicast rendezvous service host name or address. Moreover, in case of relying on a third-party CDN broker, the latter indicates here the original targeted host name (FQDN) before redirecting the request to the Multicast rendezvous service. |

METHOD AND APPARATUS FOR PROCESSING MULTICAST SIGNAL

CROSS-REFERENCE TO RELATED APPLICATIONS

This application is a National Stage Application under 35 U.S.C. 371 of International Application No. PCT/KR2021/007942, filed on Jun. 24, 2021, which claims the benefit of and priority to Korean Patent Application No. 10-2020-0080630, filed on Jun. 30, 2020 and Korean Patent Application No. 10-2020-0100371, filed on Aug. 11, 2020, which are hereby incorporated by reference in their entirety for all purposes as if fully set forth herein.

TECHNICAL FIELD

The present disclosure relates to an apparatus and method of processing a multicast signal.

BACKGROUND

With the development of digital technology and communication technology, the supply and demand for audio/video-based multimedia content are rapidly expanding in various fields, such as the Internet and personal media as well as broadcasting and movies. In addition, as TV screens used in households become larger due to the development of display technology, discussion about an ultra-high definition (UHD) broadcast service is increasing.

In relation to a broadcast service, a multicast transport method of transmitting the same content to a plurality of users is effective because advantages of both unicast and broadcast may be utilized. However, an existing multicast transport method has been possible only within a single network, and there have been disadvantages in that a multicast service between heterogeneous networks is impossible. Accordingly, when a multicast receiver accesses and releases heterogeneous access networks, a new multicast service should be started after an existing multicast service is ended. In addition, when a plurality of transport protocols is used, it is impossible to identify the protocols using port numbers if a protocol constituting a payload in an Internet protocol (IP)/user datagram protocol (UDP) or in IP/transmission control protocol (TCP) is not registered in an Internet assigned numbers authority (IANA). In the case of IP multicast, since a destination address and a port number use values assigned to multicast, all receivers receive a corresponding packet. In this case, if an unknown protocol is used, multicast for the corresponding packet may not be processed.

SUMMARY

An object of the present disclosure is to increase transmission efficiency in a method and apparatus for transmitting a multicast signal.

Another object of the present disclosure is to provide a transmission apparatus and method of providing a multicast service in a broadcast network.

Another object of the present disclosure is to provide an apparatus and method of receiving content data from the same multicast server through a plurality of access networks.

Another object of the present disclosure is to identify protocols when a plurality of transport protocols is used in a session layer.

Another object of the present disclosure is to transmit a packet of a predetermined format for a multicast streaming service using a common packet.

Another object of the present disclosure is to simplify a signaling acquisition process to cause a receiver to identify a protocol.

According to an aspect of the present disclosure, provided herein is a media processing apparatus, including a memory; and a processor connected to the memory. The processor may be configured to receive media based on a session including multicast and unicast, receive multicast server configuration information about the media, receive multicast gateway configuration information about the media, and control the media. According to another aspect of the present disclosure, provided herein is a media processing method, including receiving media based on a session including multicast and unicast; receiving multicast server configuration information about the media; receiving multicast gateway configuration information about the media; and controlling the media.

According to an embodiment of the present disclosure, transmission efficiency of a broadcast system may be increased.

According to an embodiment of the present disclosure, a multicast service between heterogeneous networks may be provided.

According to an embodiment of the present disclosure, a receiver may quickly start playback of a multicast service.

According to an embodiment of the present disclosure, when a plurality of transport protocols is used, a receiver may easily identify the transport protocols.

BRIEF DESCRIPTION OF DRAWINGS

The drawings are included to provide a further understanding of embodiments and illustrate embodiments together with description related to embodiments. For a better understanding of various embodiments described below, reference should be made to the following detailed description which should be read in conjunction with the following figures wherein like numerals represent like parts.

FIG. 7 illustrates multicast server configuration information according to embodiments.

FIG. 8 illustrates multicast gateway configuration information according to embodiments.

FIG. 9 illustrates multicast session information according to embodiments.

FIG. 10 illustrates unicast session information according to embodiments.

FIG. 26 illustrates URL elements according to embodiments.

FIG. 27 illustrates URL elements according to embodiments.

FIG. 30 illustrates URL elements according to embodiments.

FIG. 33 illustrates URL elements according to embodiments.

DETAILED DESCRIPTION

Reference will now be made in detail to exemplary embodiments of the present disclosure with reference to the accompanying drawings. A detailed description, which will be given below with reference to the accompanying drawings, is intended to explain exemplary embodiments of the present disclosure, rather than to show only embodiments that may be implemented according to the disclosure. The following detailed description includes specific details in order to provide a thorough understanding of the present disclosure. However, it will be apparent to those skilled in the art that the present disclosure may be practiced without such specific details.

Although most terms used in embodiments have been selected from general ones widely used in the art, some terms have been arbitrarily selected by the applicant and their meanings are explained in detail in the following description as needed. Thus, embodiments should be understood based upon the intended meanings of the terms rather than their simple names or meanings.

Figure 1:
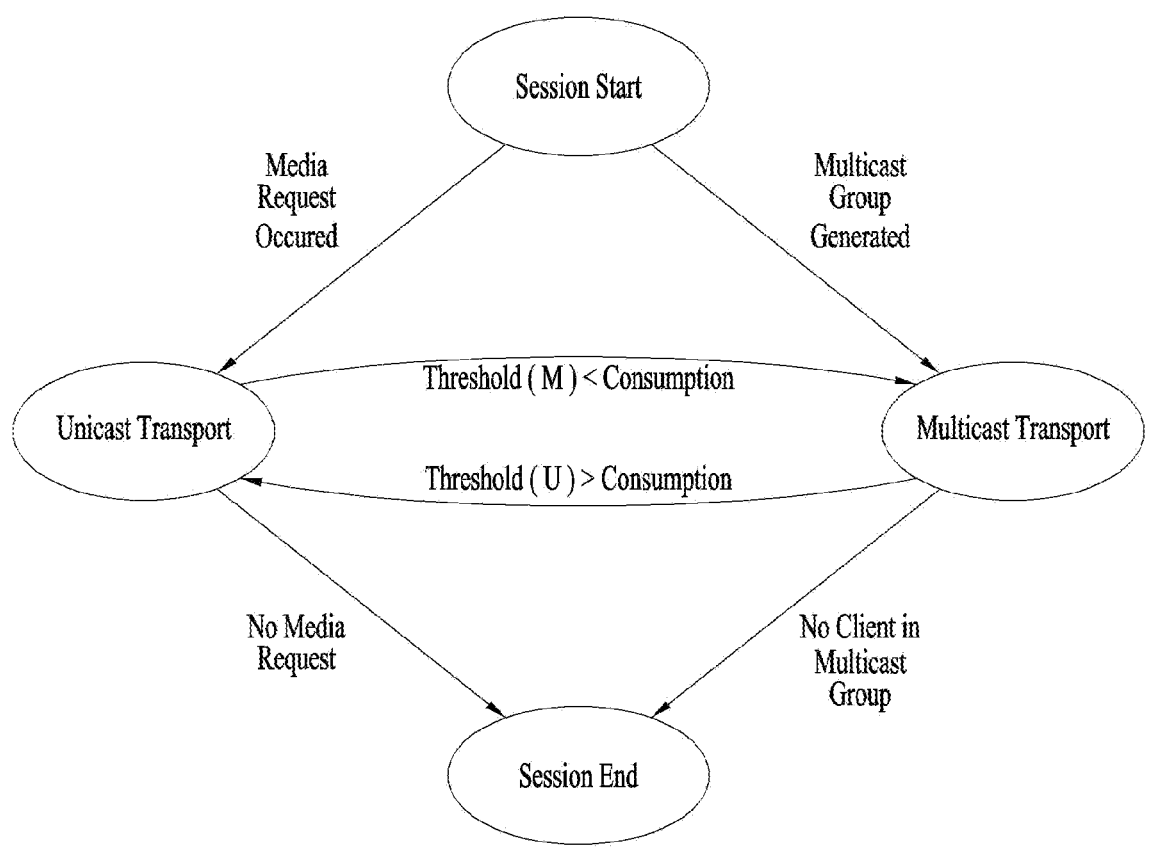
FIG. 1 illustrates a media content transmission architecture according to embodiments.

FIG. 1 illustrates a media content transmission architecture according to embodiments.

A media processing method and a media processing apparatus according to embodiments may correspond to a content server/hosting function, a multicast server, a multicast gateway, a content playback function, a receiver, and the like, illustrated in FIGS. 2 to 6, 11 to 16, 17 to 24, and 27 to 29. Each element may correspond to hardware, software, firmware, or a combination thereof, including one or more processors or integrated circuits configured to communicate with one or more memories. The media processing method and the media processing apparatus according to embodiments may be shortened to a method/apparatus according to embodiments.

The method/apparatus according to embodiments may transmit/receive media over an adaptive bitrate multicast network. According to embodiments, the media may be variously referred to as content, services, media data, or media.

The method/apparatus according to embodiments may provide an architecture capable of efficiently performing multicast-to-unicast conversion in an adaptive bitrate multicast system.

The method/apparatus according to embodiments may provide a multicast server configuration and a multicast gateway configuration for multicast-to-unicast conversion in the adaptive bitrate multicast system.

The method/apparatus according to embodiments may generate and transmit/receive signaling information in the adaptive bitrate multicast system.

A multicast transport method according to embodiments may transmit the same content to a plurality of clients to efficiently use network resources. When the consumption of content is small, unicast transport enables efficient use of network resources. To this end, a dynamic multicast-to-unicast conversion scheme is provided in an adaptive bitrate multicast environment, so that the method/apparatus according to embodiments may use network resources more efficiently when compared to a single multicast and unicast transport method.

In the adaptive bitrate media transmission environment, demand for a streamed service changes according to a region or time in which or at which the service is transmitted. In this case, if the service is always transmitted only through unicast or multicast, it is not possible to properly respond to changed load of a network and the efficiency of network operation is reduced.

When the consumption of services is small, media is transmitted through unicast, and when the consumption of services is large, media is transmitted through multicast. If the consumption of services is large only in a specific node of the network, data may be transmitted through multicast at the corresponding node and through unicast at the other nodes.

The method/apparatus according to embodiments may convert between unicast and multicast in order to efficiently use network resources in a digital video broadcasting (DVB) multicast adaptive bitrate (ABR) environment. Currently, in the DVB multicast ABR environment, data is limitedly transmitted through multicast. For conversion between unicast and multicast, a multicast gateway and a final media receiver need to be configured to determine how content is transmitted. The method/apparatus according to embodiments may provide a configuration for a consumption threshold for conversion between unicast and multicast.

Referring to FIG. 1, the method/apparatus according to embodiments may process media content transmission/reception including multicast-to-unicast conversion based on the flowchart of FIG. 1.

When a session is started, the method/apparatus according to embodiments may transmit/receive media in a unicast manner in response to a media request. The method/apparatus according to embodiments may transmit/receive media in a multicast manner corresponding to a multicast group.

A threshold may be compared with consumption to convert from multicast to unicast. The threshold may be compared with the consumption to convert from unicast to multicast. The session is ended if there is no media request or if there is no client request for the multicast group.

If media content is ready, a session for a service is activated. When a receiver (or client) makes a request for media through unicast, unicast transport is started and a multicast transport session is generated through a multicast server. If the client joins the multicast group, multicast transport is activated.

A threshold M may be a reference value for unicast-to-multicast conversion.

A threshold U may be a reference value for multicast-to-unicast conversion.

When the number of clients requesting the same unicast media exceeds the threshold (Threshold_M), which is a criterion for conversion to multicast, a content server switches transmission for the client to multicast. When the number of clients subscribed to a multicast session during transmission of media content in multimedia becomes smaller than the threshold (Threshold_U), which is a criterion for conversion to unicast, transmission of the corresponding media content is converted to unicast.

If there is no client requesting content during unicast transport, the session is ended. In addition, if there is no client joining the multicast group during multicast transport, the session is ended. Alternatively, in the case of a live service, even if there is no receiving client, the session may be maintained until a service termination point of live content and then be ended.

The method/apparatus according to embodiments may correspond to or include a content server, a multicast server, a multicast gateway, and a content playback function and generate and transmit/receive configuration data or signaling information, for media transmission/reception processing.

Figure 2:
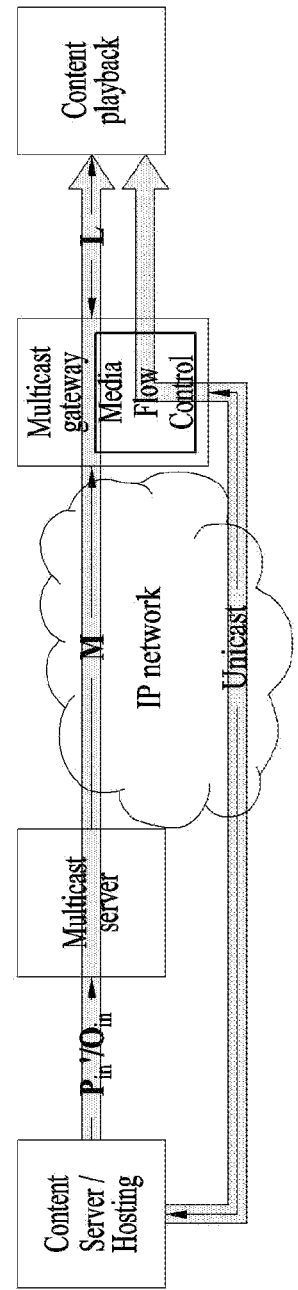
FIG. 2 illustrates a multicast and unicast conversion operation according to embodiments.

FIG. 2 illustrates a multicast and unicast conversion operation according to embodiments.

In relation to conversion of FIG. 1, the method/apparatus according to embodiments may perform the multicast and unicast conversion operation according to embodiments.

Media content transmitted through multicast is transmitted to a multicast server connected (or ingested) through a content server/hosting function of the apparatus according to embodiments. The multicast server transmits the same media content/media segment to a plurality of multicast gateways.

The multicast gateway of the apparatus according to embodiments delivers content received through multicast to a content playback function.

In relation to multicast transport according to embodiments, a DVB multicast ABR environment may use a pin Pin' or an interface Oin as ingest, use an interface M for multicast transport, and use an interface L for media transmission to the content playback function.

Media content transmitted through unicast is directly transmitted from the content server/hosting function to the multicast gateway. In this case, the multicast gateway may make a request for content to the content server/hosting function using HTTP(S). For a method of transmitting media content from the multicast gateway to the content playback function, the same interface as in multicast may be used.

The content playback function may receive a unicast stream through the multicast gateway serving as a home gateway. In this case, the multicast gateway supports both a multicast stream and unicast reception.

A multimedia flow control subfunction of the apparatus according to embodiments may manage and control an operation for providing continuity of corresponding content when the same media content is converted from multicast to unicast or from unicast to multicast.

The multimedia flow control subfunction may be included in a multicast gateway subfunction included in the multicast gateway of FIG. 2.

Figure 3:
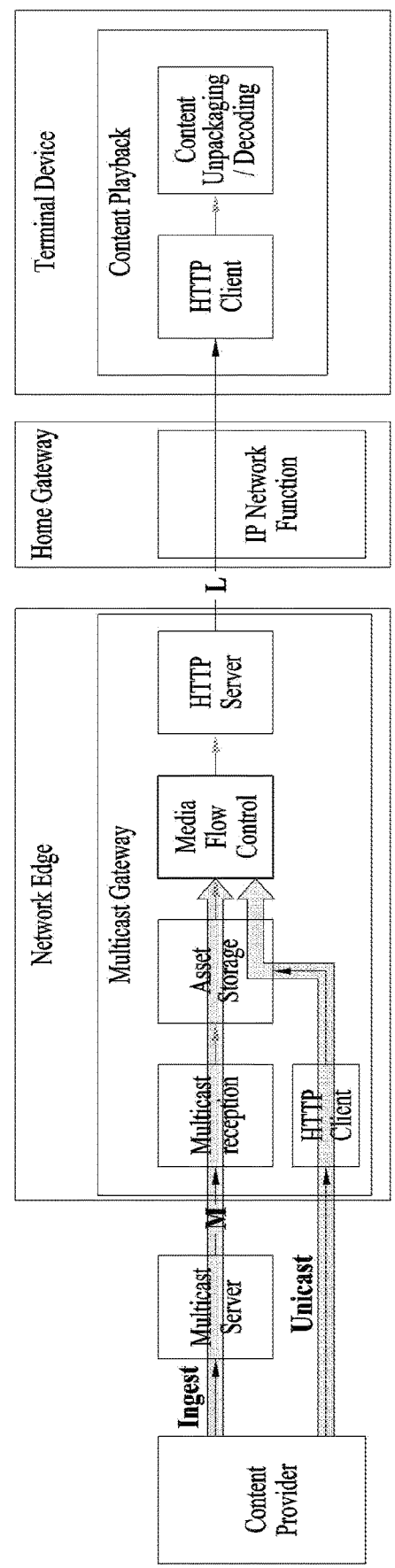
FIG. 3 illustrates a multicast gateway architecture according to embodiments.

FIG. 3 illustrates a multicast gateway architecture according to embodiments.

In FIG. 3, a configuration in which the multicast gateway according to embodiments as illustrated in FIG. 2 is connected to a network edge. The method/apparatus according to embodiments may perform multicast/unicast media processing based on the architecture illustrated in FIG. 3.

A content provider may correspond to a content server/hosting function, and the network edge may correspond to an IP network. For interfaces between devices, reference may be made to a description of FIG. 2. Additionally, a home gateway may relay the network edge and a terminal device based on an IP network function. The terminal device may correspond to a content playback function.

For example, the multicast gateway of the apparatus according to embodiments deployed on the network edge may include a multicast receiver, an HTTP client, an asset storage, a media flow controller, and an HTTP server.

The method/apparatus according to embodiments may transmit/receive multicast-based media. For example, the method/apparatus according to embodiments transmits/receives media through the content provider, the multicast server, the multicast receiver, the asset storage, and the media flow controller.

The method/apparatus according to embodiments may transmit and receive unicast-based media. For example, the method/apparatus according to embodiments transmits and receives media through the content provider, the HTTP client, the asset storage, and the media flow controller.

Figure 4:
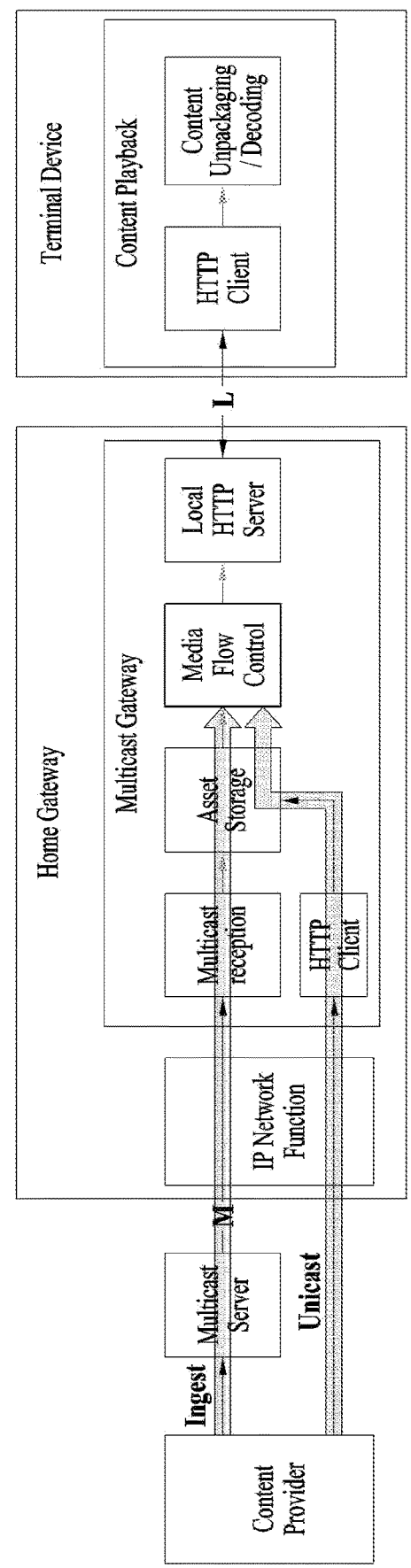
FIG. 4 illustrates a multicast gateway architecture according to embodiments.

FIG. 4 illustrates a multicast gateway architecture according to embodiments.

In FIG. 4, an example is illustrated in which the multicast gateway according to embodiments as illustrated in FIG. 2 is deployed on a home gateway. The method/apparatus according to embodiments may perform multicast/unicast media processing based on the architecture illustrated in FIG. 4.

For a description of elements illustrated in FIG. 4 overlapping with the elements illustrated in FIGS. 2 and 3, reference may be made to a description of FIGS. 2 and 3.

The multicast gateway according to embodiments may be deployed on the home gateway to transmit and receive multicast-based and/or unicast-based media.

Figure 5:
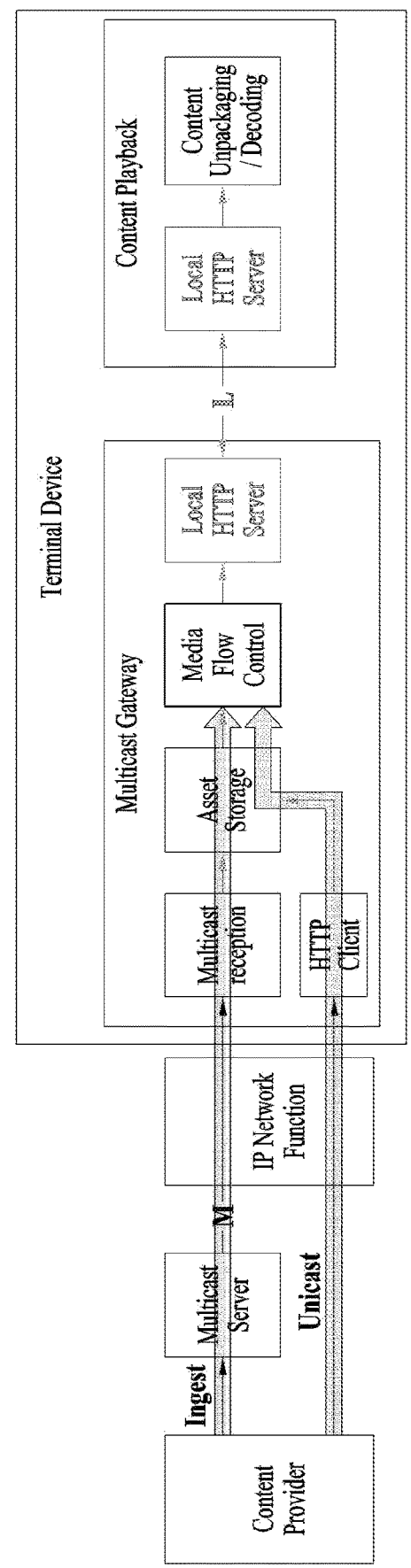
FIG. 5 illustrates a multicast gateway architecture according to embodiments.

FIG. 5 illustrates a multicast gateway architecture according to embodiments.

In FIG. 5, an example is illustrated in which the multicast gateway according to embodiments illustrated in FIG. 2 is deployed on a terminal device. The method/apparatus according to embodiments may perform multicast/unicast media processing based on the architecture illustrated in FIG. 5.

For a description of elements illustrated in FIG. 5 overlapping with the elements illustrated in FIGS. 2 to 4, reference may be made to a description of FIGS. 2 to 4.

The multicast gateway according to embodiments may be deployed on the terminal device end to transmit/receive multicast-based and/or unicast-based media.

Next, a session information configuration supporting a multicast-to-unicast conversion operation in the architectures as illustrated in FIGS. 1 to 4 will be described.

Figure 6:
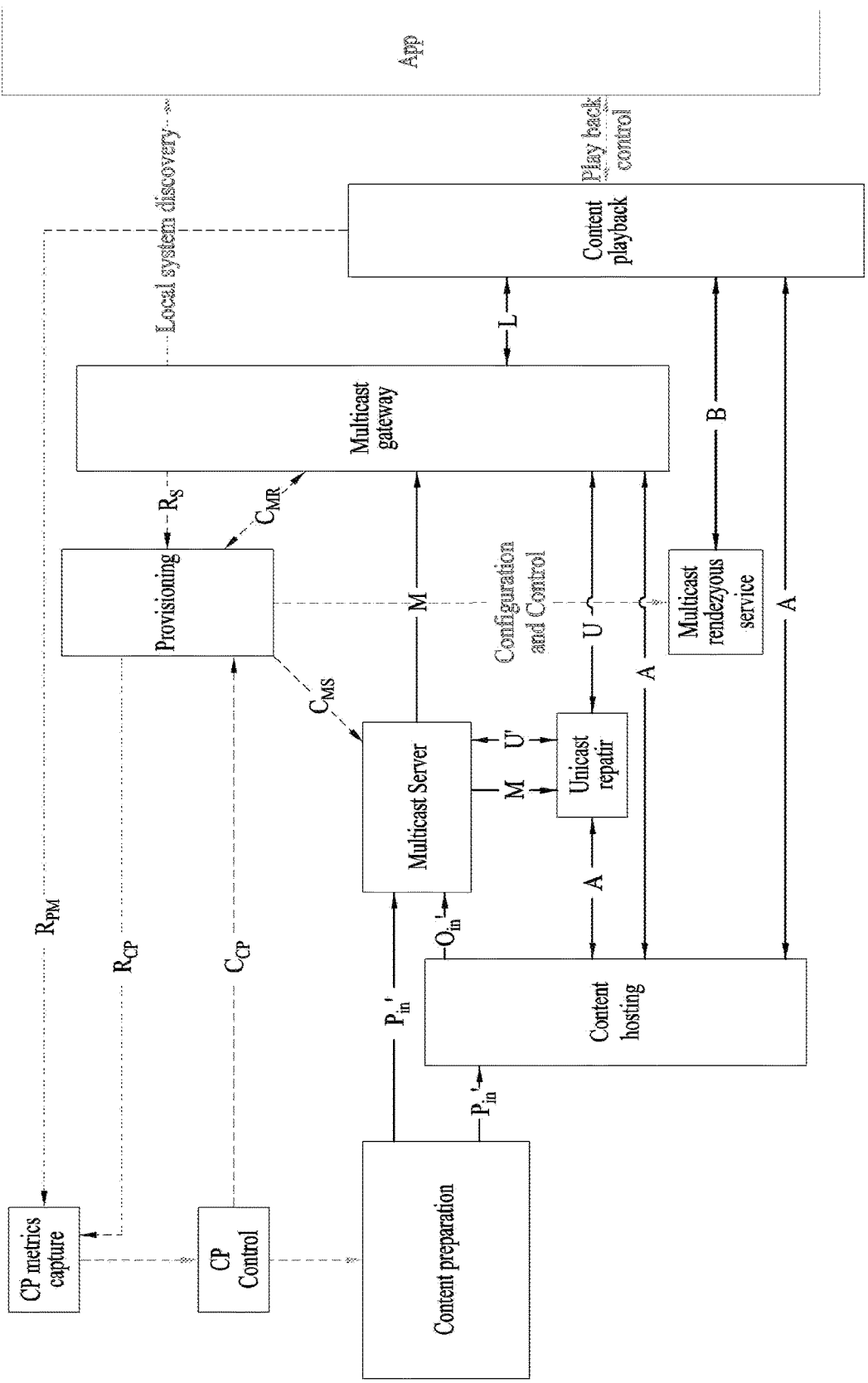
FIG. 6 illustrates an adaptive bitrate multicast network architecture according to embodiments.

FIG. 6 illustrates an adaptive bitrate multicast network architecture according to embodiments.

As illustrated in FIGS. 1 to 5, the apparatus according to embodiments may generate signaling information indicating unicast-multicast conversion and indicating that a multicast-based media session and a unicast-based media session are the same session on architectures according to embodiments.

FIG. 6 illustrates an architecture for an adaptive bitrate (ABR) multicast network in relation to the above operation. For conversion between multicast and unicast, a multicast server is configured via an interface (interface CMS), and a multicast gateway is configured via an interface (interface CMR). For example, when a network is configured by unidirectional transmission such as a TV receiver, the multicast gateway may be configured via an interface M through the multicast server.

The method/apparatus according to embodiments may generate multicast server configuration information of FIG. 7, multicast gateway configuration information of FIG. 8, multicast session information of FIG. 9, and unicast session information of FIG. 10 and deliver the generated information together during multicast-based media transmission/reception and/or unicast-based media transmission/reception.

FIG. 7 illustrates multicast server configuration information according to embodiments.

As described with reference to FIG. 6, the method/apparatus according to embodiments may generate and transmit/receive configuration information used to support multicast-to-unicast conversion in a network edge, a home gateway, and a terminal device by a content server, a provider, a multicast server, a gateway, or a corresponding processor.

The syntax of a multicast server configuration information (MulticastServerConfiguration) element according to embodiments will now be described.

The MulticastServerConfiguration element may be configured in a provisioning function in the multicast ABR (MABR) architecture according to embodiments of FIG. 6. The MulticastServerConfiguration element may be transmitted to a multicast server via an interface (e.g., interface CMS). For multicast-to-unicast conversion, when a content server/hosting function starts unicast transmission, details of MulticastServerConfiguration may be updated and retransmitted. The multicast server may recognize that multicast transport is converted to unicast transport and stop multicast transport accordingly. Transmission for MulticastServerConfiguration may be performed earlier than a time at which multicast-to-unicast conversion is to be performed, so that the multicast server may prepare for conversion to unicast.

Session conversion ready information (@readyToSessionConversion)—An indicator indicating that conversion to unicast is scheduled with respect to a multicast session included in the configuration.

Unicast Session (UnicastSession)—An element for the unicast session to be converted to the multicast session included in the configuration.

FIG. 8 illustrates multicast gateway configuration information according to embodiments.

The method/apparatus according to embodiments may generate and transmit/receive configuration information used to support multicast-to-unicast conversion in a network edge, a home gateway, and a terminal device by a content server, a provider, a multicast server, a gateway, or a corresponding processor.

FIG. 8 illustrates the syntax of a multicast gateway configuration (MulticastGatewayConfiguration) element.

The multicast gateway configuration element may be configured in a provisioning function in an MABR architecture. The multicast gateway configuration element may be transmitted to a multicast gateway through an interface (interface CMR). Alternatively, when a network is configured for unidirectional transmission, the multicast gateway configuration element is first transmitted to a multicast server via an interface (interface CMS), and the multicast server may transmit the multicast gateway configuration element again via an interface (interface M). The multicast gateway may be configured by this architecture. For multicast-unicast conversion, when unicast transport is started by a content server/hosting function, details of the multicast gateway configuration (MulticastGatewayConfiguration) element may be updated and retransmitted. The multicast gateway may confirm that corresponding multicast transport is converted to unicast transport. Then, multicast transport is stopped and converted to unicast. Transmission for MulticastGatewayConfiguration may be performed earlier than a time at which multicast-to-unicast conversion is to be performed, so that the multicast gateway may prepare for conversion to unicast.

Session conversion ready information (@readyToSessionConversion)—An indicator indicating that conversion to unicast is scheduled with respect to a multicast session included in the configuration.

Unicast Session (UnicastSession)—An element for a unicast session to be converted to a multicast session included in the configuration.

Referring to FIGS. 7 and 8, the multicast server configuration (MulticastServerConfiguration) is a root element of a multicast server configuration instance.

Validity period (@validityPeriod): Indicates a time period after receipt for which this instance is valid.

Valid until (@validUntil) may indicate a deadline after which this instance ceases to be valid. If this attribute is present, the validity period may not be present.

Session conversion ready information (@readyToSessionConversion) indicates that a unicast session is ready.

A multicast gateway transport session (MulticastGatewayConfigurationTransportSession) is a container for multicast gateway configuration transport session parameters.

A multicast session (MulticastSession) is a container for multicast session parameters.

A unicast session (UnicastSession) is a container for unicast session parameters.

If the multicast gateway receives a multicast gateway configuration through a cached resource and a validity period attribute is present, a validity period related value is decremented by a cache age.

The validity period may be expressed as a duration type, and a validity end time may be expressed as a date time type.

FIG. 9 illustrates multicast session information according to embodiments.

FIG. 9 illustrates the syntax of the multicast session element illustrated in FIGS. 7 and 8.

Service identifier (@serviceIdentifier) is a service identifier for a logical service with which this session is associated. This value may be expressed as a uniform resource identifier (URI) string.

Content playback availability offset (@contentPlaybackAvailabilityOffset) indicates an availability time offset adjustment applied to an original presentation manifest. This value may be expressed as a duration string.

Session conversion start time (@sessionConversionStartTime): Indicates a start time of unicast transport for this service. A multicast session may be terminated. The value of this attribute may be expressed as a date and time.

Presentation manifest locator (PresentationManofestLocator): Indicates a URL of a presentation manifest for a linear service.

Manifest ID (@manifestId): A value that uniquely identifies a presentation manifest within the scope of a multicast session.

Content type (@contentType): Indicates an MIME content type of this presentation manifest.

Multicast gateway session reporting (MulticastGatewaySessionReporting): A container for multicast session reporting parameters.

Reporting locator (ReportingLocator): A container for a multicast gateway reporting endpoint.

Proportion (@proportion): Indicates the proportion of multicast gateway instances that send session reports to the specified endpoint.

Period (@period): Indicates a session reporting periodicity.

Random delay (@randomDelay): An additional random period that a multicast gateway should delay between sending session reports.

Multicast transport session (MulticastTransportSession): A container for multicast transport session parameters.

Session conversion start type (@sessionConversionStartTime): An attribute indicating a time when a corresponding multicast session is converted to unicast. This indicates that a multicast session will be stopped from that time. Therefore, a multicast related configuration is ignored and a UnicastSession element is referenced.

FIG. 10 illustrates unicast session information according to embodiments.

FIG. 10 illustrates a detailed syntax of the unicast session illustrated in FIGS. 7 and 8.

Service ID (@serviceIdentifier): A service identifier for a local service with which this session is associated. This may be the same as the service ID of multicast.

For a description of attributes in FIG. 10, reference may be made to a description of the equivalent attributes of FIG. 7.

Unicast presentation manifest locator (UnicastPresentationManifestLocator): A URL of a presentation manifest for a linear service delivered in the unicast session.

Multicast gateway unicast session reporting (MulticastGatewayUnicastSessionReporting): A container for unicast session reporting parameters. A media presentation description (MPD) related to media may be acquired through this container. The method/apparatus according to embodiments may efficiently obtain a presentation manifest (e.g., MPD) for multicast-to-unicast conversion upon receipt of multicast (ABM)-based media (this will be described in detail with reference to FIGS. 21 to 30).

When unicast transmission/reception is activated, all address information such as the MPD may be updated. According to multicast (M) and unicast (U), necessary information may be generated and transmitted.

Each element and attribute may be defined as follows.

Unicast session (UnicastSession): An element for configuring the unicast session.

Service identifier (@serviceIdentifier): An identifier for a service with which this session is associated. This has the same service ID value as a converted multicast session.

Unicast presentation manifest locator (UnicastPresentationManifestLocator): URL information of a presentation manifest to be delivered through unicast.

Multicast gateway unicast session reporting (MulticastGatewayUnicastSessionReporting): This may configure corresponding consumption report related parameters for a session to delivered through unicast.

When the configuration according to embodiments is completed and it is a session conversion time, the multicast gateway may receive a unicast stream using an HTTP(S) request through a presentation manifest received through the unicast session element (UnicastSession).

Figure 11:
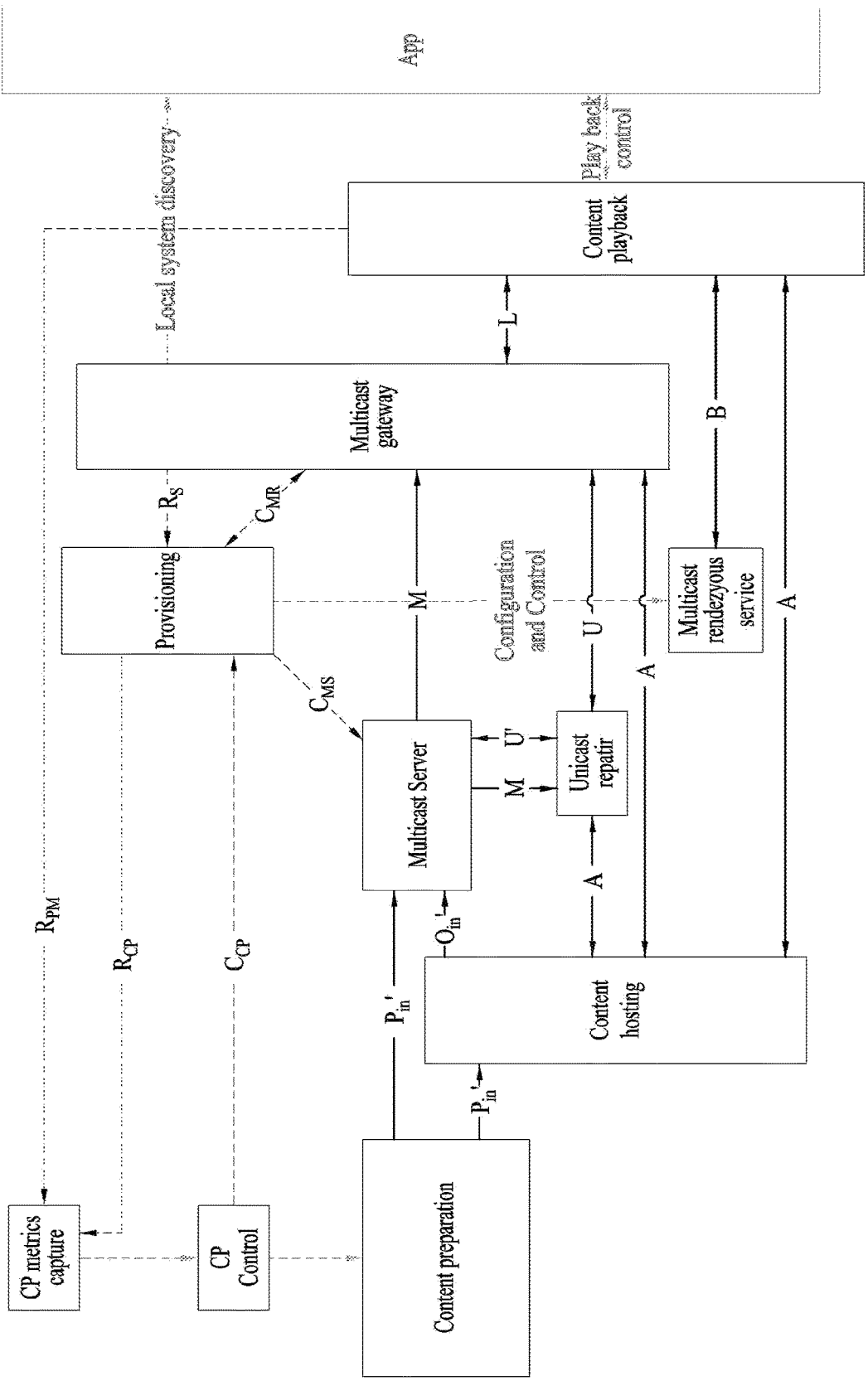
FIG. 11 illustrates a multicast architecture according to embodiments.

FIG. 11 illustrates a multicast architecture according to embodiments.

The method/apparatus according to embodiments may perform multicast/unicast media processing based on the architecture illustrated in FIG. 11.

A content hosting function, a multicast server, a multicast gateway, a content playback function, a content preparation function, a provisioning function, a unicast repair function, and a multicast rendezvous service function of FIG. 11 may correspond to the elements of FIGS. 2 to 6. Each element may correspond to a function portion or to hardware, software, firmware, or a combination thereof, including one or more processors or integrated circuits configured to communicate with one or more memories.

Reference Points

In a reference architecture of FIG. 11, a relationship between logical functions may be defined as a reference point. When such an architecture is actually used, the reference point may be implemented as a specific interface, and necessary information between related functions may be exchanged using each specific protocol.

Reference points for transmitting content (media) in the architecture of FIG. 11 are as follows.

Data Plane Reference Points

L: Unicast HTTP (including HTTPS) interaction between the content playback function and the multicast gateway. This interface may include the fetching of all specified types of content.

When the multicast gateway and the content playback function are co-located on a single end device, such as a set-top box (see clause 3.3), the interface L may be realized as a local API.

B: Bootstrap unicast HTTP(S) interaction directly between the content playback function and the multicast rendezvous service function. This interface may be used to request a presentation manifest at the start of a linear playback session.

A: HTTP(S) acquisition from the content hosting function of content not provided over a reference point M. This interface may be used by the content playback function to retrieve content out of scope for the reference point L. This interface may be used in some deployments by the unicast repair service function to retrieve content from the content hosting function for content repair. Also, this interface may be used by the multicast gateway for retrieving content directly from the content hosting function via unicast when a reference point U is unable to perform content repair.

M: Multicast IP content transmission by the multicast server function and reception by the multicast gateway function and, in some deployments, reception by the unicast repair service function.

U: Unicast interaction between the unicast repair service function and a unicast repair client in the multicast gateway and a unicast repair service. This interface may be used to carry payloads used for content repair functions in addition to requests for such payloads.

U': Unicast interaction between the unicast repair service function and the multicast server as an alternative to fetching repair content over the reference point A. This interface may be used to carry payloads used for content repair functions in addition to requests for such payloads.

Pin: Publication of content to the content hosting function by a content packaging subfunction.

This interface may be implemented as a push interface or content may be pulled on demand from a content packaging function.

Oin: Ingest of content by the multicast server from the content hosting function. This interface may be typically implemented as a pull interface.

Pin': Ingest of content by the multicast server directly from the content packaging function. This interface may be typically implemented as a push interface.

Control Plane Reference Points

Reference points for transmitting control signaling and operational reporting information in the architecture of FIG. 11 are as follows.

CMS: Control interface for configuration of the multicast server function.

CMR: Control interface for configuration of the multicast gateway function.

CCP: Control interface for configuration of the provisioning function.

RS: Service reporting by the multicast gateway function to a service reporting capture function.

RCP: Service reporting by a service reporting capture subfunction to a content provider metrics reporting capture function.

RPM: Reporting of playback metrics by a content playback function to the content provider metrics reporting capture function.

Figure 12:
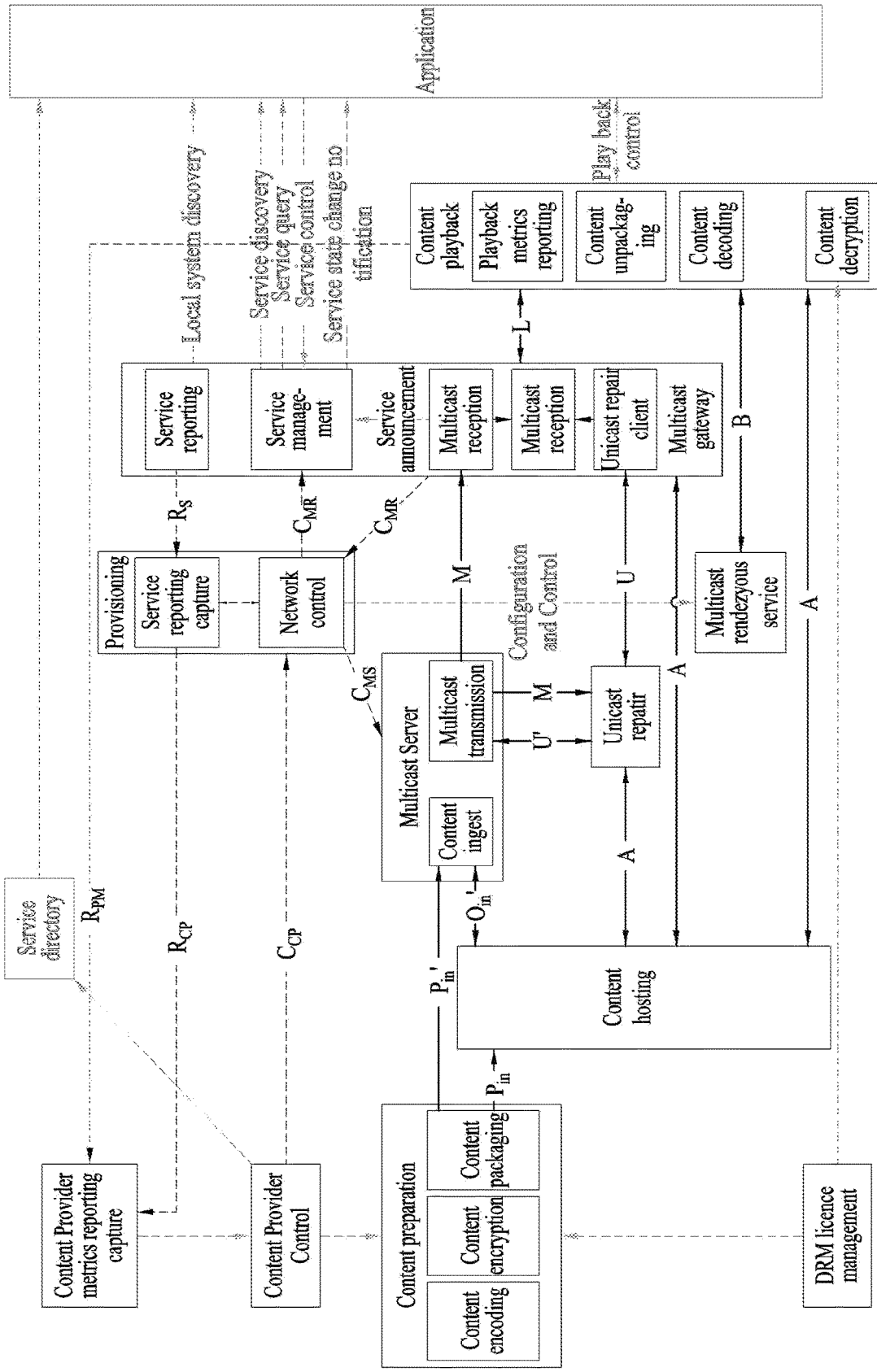
FIG. 12 illustrates a multicast architecture according to embodiments.

FIG. 12 illustrates a multicast architecture according to embodiments.

FIG. 12 illustrates a reference architecture as in FIG. 11.
Reference Architecture Diagram For a description of elements of FIG. 12 corresponding to the elements of FIG. 11, reference may be made to a description of FIG. 11.

Functions

Function portions constituting the architecture related to the method/apparatus according to embodiments may correspond to hardware, software, firmware, or a combination thereof, including one or more processors or integrated circuits configured to communicate with one or more memories.

Content Preparation
Content Encoding

A content encoding function (or a content encoder) converts a source media stream to encoded media to reduce bitrate. A single source media stream may be converted into a plurality of different encoded representations so as to meet delivery conditions. In order for a content playback function to operate adaptively according to delivery conditions, a virtual segment boundary marker may be included in an encoded representation.

Output of the encoder may be a cleartext stream formatted to be appropriate to be transmitted to an encryption function or a packaging function. For example, the output of the encoder may be an MPEG elementary stream, an MPEG-2 TS, or an intermediate format having a purpose similar thereto.

Content Encryption

The content encryption function receives the cleartext stream and encrypts the cleartext stream into a cyphertext stream. An encryption key may be obtained from a DRM license management function.

Content Packaging

The content packaging function collects one or more encoded representations and configures data according to a desired packaging format. In dynamic adaptive streaming, the output of a packager is a sequence of a packaged media segment including a representation switching point aligned across multiple representations of the same source media stream. A packaging format may be an ISO base media file format (MP4) and a fragmented MPEG-2 TS.

Content Hosting

A content hosting function may be ready to use prepared content for the following cases.

In the case of content ingest through an interface Oin, for unicast delivery to a multicast server In the case of cache miss through an interface A, for a unicast repair service through the interface A to a multicast gateway In the case of transmission through an interface B, for a content playback function that is not connected via a multicast receiver The content hosting function may be implemented by part of a simple web server or an origin cluster or operate by a distributed CDN. Therefore, the content hosting function may receive content from an appropriate content server using load balancing and request distribution techniques (DNS round-robin or HTTP 302 redirect).

Multicast Server

The multicast server collects content from a content source. That is, a media stream is input via the interface Oin, and in general, a protocol installed in a media player may be used. The payload of the media stream collected by the multicast server is encapsulated in a delivery unit of a multicast delivery protocol and transmitted through the network. In addition, the payload of the media stream is transmitted to a subscribed multicast gateway client using IP multicast via an interface M. The payload of the media stream may be configured by receiving configuration information from a network control function via an interface CMS.

Content Ingest

The multicast server may perform push and pull ingest methods.

HTTP(S) Pull Ingest via Interface Oin:

Similar to an adaptive streaming media player, the multicast server downloads a packaged media segment from the content hosting function based on details described in a presentation manifest. In this case, the interface Oin may have different detailed operation characteristics from an interface L but may be functionally the same as the interface L. The segment may be packaged in MPEG-DASH or HLS and the segment may be simultaneously downloaded from one or more representations described in the presentation manifest. A manifest format such as DVB-DASH, MPEG-DASH, or HLS may be supported.

HTTP(S) Push Ingest via Interface Pin':

An HTTP(S) push interface such as Web distributed authoring and versioning (WebDAV) may be provided. The content packaging subfunction uploads a media segment to the content ingest function as soon as the media segment is created. The segment may be packaged in a format such as MPEG-DAH or HLS.

RTP Push Ingest via Interface Pin'

An RTP-based push ingest mechanism is provided to the content packaging subfunction. The packager sends an MPEG-2 TS packet through an RTP. The boundary of a segment may be indicated using a virtual segment boundary marker.

Multicast Transmission

A stream received by the content ingest subfunction is transmitted over the payload of an IP multicast packet via an interface M.

Unicast Repair Service

The unicast repair service provides a payload repair function to a unicast repair client within the multicast gateway via a reference point U. The following repair modes may be considered.

The unicast repair service function receives multicast content transmitted through a reference point M and locally caches a copy of a packet stream in order to satisfy a repair request by the unicast repair client.

If the requested packet is not satisfied in the cache of the unicast repair service function, the packet repair request may be transferred to the multicast server via an interface U'.

The unicast repair service function may convert the packet repair request into an HTTP request for the content hosting function using the same interface as the reference point A.

When the same repair request is received from multiple multicast gateways, it may be efficient to transmit the repair packet through the reference point M.

Multicast Gateway

A main purpose of the multicast gateway is to deliver a packaged content segment to a content playback function. The multicast gateway may be implemented as local origin including a forward proxy or a reverse proxy. The multicast gateway may be implemented as user premises equipment such as a home gateway device or as an IP-connected set-top box (STB). The multicast gateway may also be deployed in an upstream network node instead of the user premises equipment.

A content request may be received from one or more instances of the content playback function via an interface L. For requested content, cached in an asset storage subfunction is directly provided or content obtained via the interface A is indirectly provided. In this case, content obtained via the interface A may optionally be cached in the asset storage subfunction.

Service Management

A service management subfunction may collect service configuration information for a multicast content stream receivable via the interface M and location information of a service reporting capture function. Such information may be received as follows.

Direct reception via an interface CMR from the network control function

Indirect reception from a multicast reception subfunction (when the information is transmitted via the interface M)

Reception through a unicast response delivered via the interface A from the content hosting function Multicast Reception A multicast reception subfunction receives a content stream requested by an end device via the interface M or configured for the end device. Content received normally without error may be cached in the asset storage so that corresponding content may be used later. Content damaged during transmission may be repaired using a specific technique (e.g. forward error correction, unicast repair by the unicast repair client via the interface U, or unicast retrieval via the interface A) before the multicast gateway caches content. Unrepaired content is not delivered via the interface L.

Unicast Repair Client

When loss of a multicast packet is detected, the multicast packet is repaired using forward error correction information received via the interface M or using the unicast repair service (e.g. unicast packet retransmission or multicast segment loss signaling) via the interface U. A packet not repaired in this way may use unicast transport via the interface A.

Asset Storage

The asset storage subfunction provides a function to temporarily store information to be provided via an interface L. The storage function is performed only by the multicast gateway.

Managed pre-positioned media content assets. For example, all or part of content or advertisement-related information, that is popular with multiple users, may be stored before actual use.

Temporary cache for a linear media content segment

Service Reporting

Service-related metrics (e.g. telemetry and analytics data) are reported to the service reporting capture subfunction via an interface RS by a service reporting subfunction.

Provisioning

The purpose of a provisioning function is as follows.

To collect service reporting information centrally from deployed multicast gateway instances.

To configure resources in the network.

To configure the multicast server to use the configured network resources.

To configure the multicast gateway to use the configured network resources.

The provisioning function may be linked with a content provider control function based on information transmitted via an interface CCP.

Service Reporting Capture

Service reporting information collected from the multicast gateway may be provided to the service reporting capture function via the interface RS. A report may include major indicators (e.g. cache hit-ratio or viewership) that indicates the performance of metrics and services. The metrics may vary depending on which channel has been requested, when a channel has been established, or how many segments have been cached. The service reporting information may be used to improve service performance or configure a multicast channel.

The service reporting capture function may send service reporting information to a content provider metrics reporting capture function via an interface RCP. Information such as multicast content and bitrate may be included in the corresponding reporting information.

Network Control

The network control function may perform functions such as control, configuration, and allocation of network resources. Here, the network resources may include resources for multicast transport via the interface M and unicast operation via the interfaces U and A.

In a centralized system, the network control function may distribute configuration information for a transmittable multicast stream to network resources. Additionally, the network control function may transmit this configuration information to the multicast server via the interface CMS or to the multicast gateway via the interface CMR. The configuration information for the transmittable multicast stream may be updated according to the control policy of the content provider or the number of requests by a client.

Content Provider Control

The content provider control function enables the network control function to provide information about available services through the multicast delivery path M via the interface CCP. A single content provider control function may interact with multiple network control functions operated by different network providers.

Content Playback

The content playback function is a function that manages the request, reception, decryption, and presentation of content. Only unicast transport is supported via the interface L. The playback operates regardless of a transmission path through which content is delivered.

The content playback function may be deployed separately from the multicast gateway in an end device such as a smartphone. Alternatively, the content playback function may be combined with the multicast gateway in an STB or a connected TV.

Additional functions of the content playback function are as follows.

Search for a presentation manifest for a linear service via an interface B

Search for all content not searched through the multicast gateway via the interface B Content Unpackaging A content unpackaging subfunction may extract elementary stream data from an obtained transport object and provide the elementary stream to a content decryption subfunction and a content decoding subfunction. For example, in the case of an ISO base media file format segment, the content unpackaging subfunction extracts an appropriate media data box, and in the case of an MPEG-2 TS, the content unpackaging subfunction filters a desired packet identifier (PID) and extracts the payload of a recombined PES packet.

Content Decryption

If a digital rights management (DRM) system is running, the content decryption subfunction obtains a decryption key from an appropriate DRM license management function and decrypts an encrypted elementary stream.

Content Decoding

The content decoding subfunction reads and interprets the contents of an elementary media stream to enable rendering for playback on a screen or through a loudspeaker.

Playback Metrics Reporting

A playback metrics reporting subfunction may report information related to the operation and quality of content playback to the content provider metrics reporting capture function through an interface RPM. Metrics may include an HTTP request/response, an initial playback delay, a buffer level, a presentation switching event, and network throughput. The reported playback metrics are directly related to the QoE of an end user and may be used to optimize the quality in the content provider or the network.

Multicast Rendezvous Service

A multicast rendezvous service manages data records on multiple multicast gateway instances (current status of the multicast gateway status, status of a multicast session, and related data). The network control function may provide such related information to the multicast rendezvous service.

The multicast rendezvous service handles an initial request for a presentation manifest received through a reference point B from the content playback function. The multicast rendezvous service determines whether there is an active multicast session for a linear service corresponding to the requested presentation manifest. In addition, the multicast rendezvous service determines whether there is a proper active multicast gateway to be used by the content playback function for the corresponding request.

If the second condition is satisfied, the multicast rendezvous service may redirect the request to the multicast gateway. Otherwise, the multicast rendezvous service redirects the request to the content hosting function, and in this case, a corresponding session operates through unicast.

DRM License Management

The DRM license management function provides an appropriate encryption key used by the content encryption function to protect core content and supplies licenses to the content decryption subfunction so that the content playback function may decrypt protected content.

Application

An application controls the content playback function. For example, the application may be a built-in control application (EPG application) of a TV or an STB or may be a third-party application provided by a content provider. An interface that the application uses to control the content playback function generally involves delivery of a reference point of a presentation manifest (e.g. URL of MPEG-DASH MPD) for initiating playback of an individual linear service. The application may interact with the service management subfunction of the multicast gateway in order to discover existing linear services and to control reception by the multicast gateway. The application may discover the existence of the linear services through individual interaction with an application-specific service directory function.

Service Directory

The application may use a private service directory to find an available linear service. The service directory function may be configured by the content provider control function.

Deployment Models of Multicast Gateway

In the multicast ABR architecture according to embodiments, the multicast gateway function may operate as various nodes in the network.

Multicast Gateway Deployed on a Network Edge Device

Figure 13:
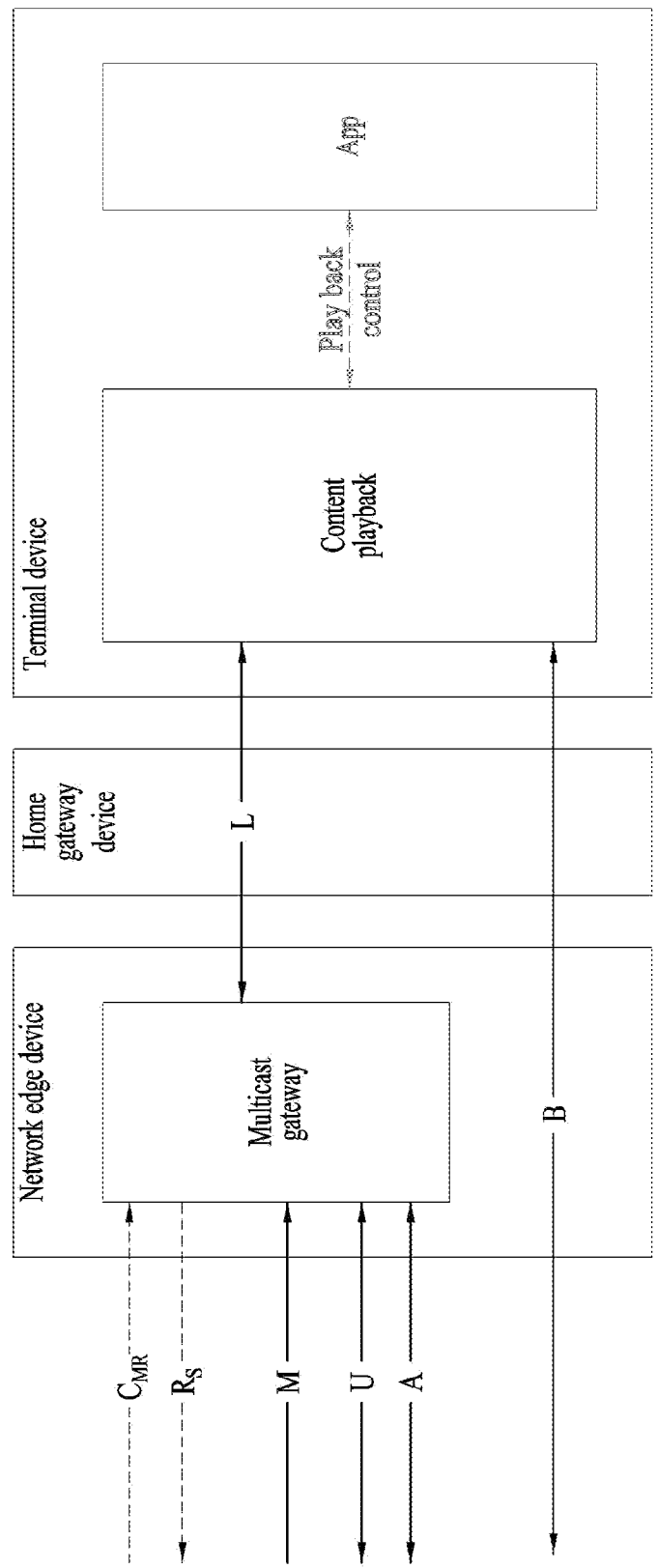
FIG. 13 illustrates a multicast gateway architecture according to embodiments.

FIG. 13 illustrates a multicast gateway architecture according to embodiments.

As illustrated in FIG. 3, a multicast gateway may be deployed on a network edge device. The network edge device, a home gateway device, and a terminal device may transmit and receive data based on an interface according to the type of data.

If the multicast gateway is implemented in the network edge device, the terminal device does not support IP multicast reception from a home network. The terminal device includes a content playback function, and an application that controls linear playback is installed in the terminal device.

The multicast gateway provides a multicast-to-unicast conversion function to multiple home gateway devices. Therefore, traffic in an access network between the network edge device and the home gateway devices becomes unicast.

Figure 14:
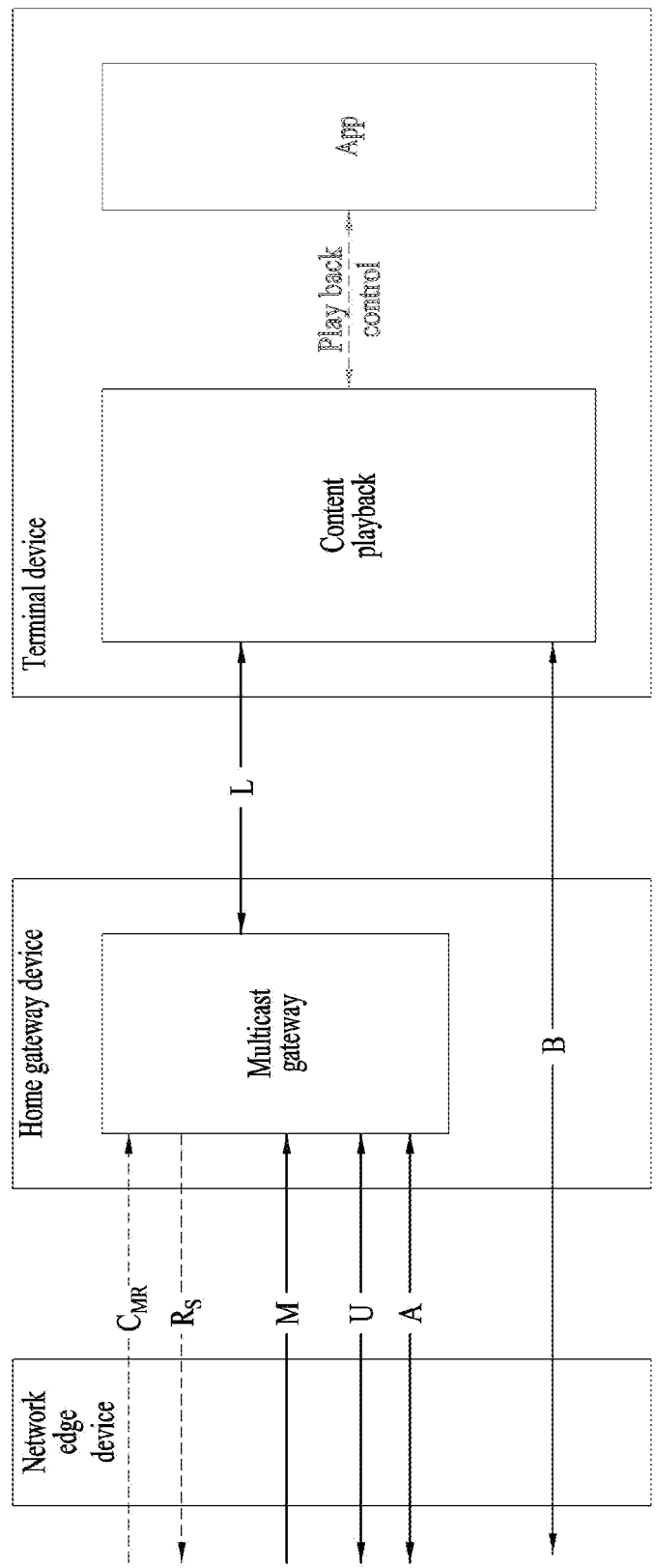
FIG. 14 illustrates a multicast gateway architecture according to embodiments.

FIG. 14 illustrates a multicast gateway architecture according to embodiments.

As illustrated in FIG. 4, a multicast gateway may be deployed on a home gateway device.

The multicast gateway is deployed in the home gateway device such as a router that is mainly supplied by an Internet service provider (ISP). In addition, the multicast gateway provides a multicast-to-unicast conversion function to a plurality of terminal devices in the same home network. Each of these terminal devices has an instance of a content playback function, and an application related thereto is installed in the terminal device.

Figure 15:
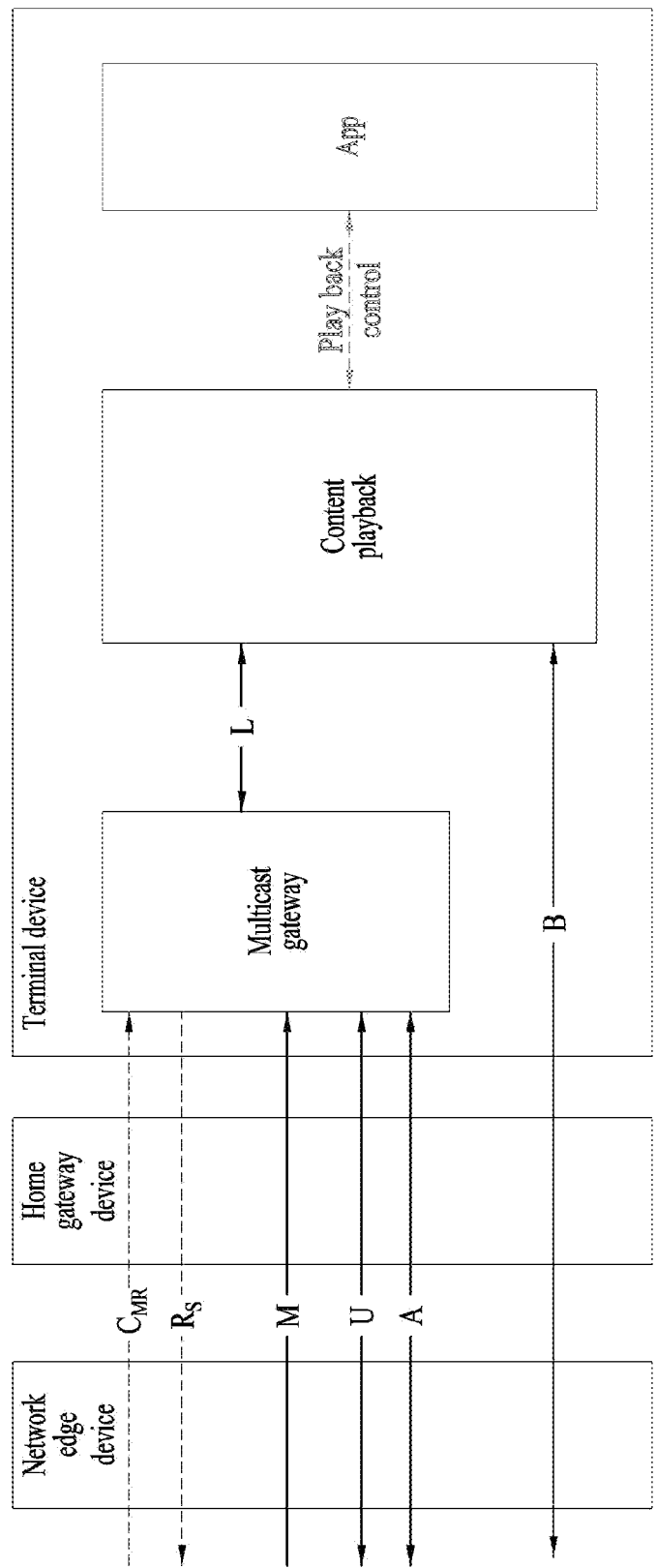
FIG. 15 illustrates a multicast gateway architecture according to embodiments.

FIG. 15 illustrates a multicast gateway architecture according to embodiments.

As illustrated in FIG. 5, a multicast gateway may be deployed on a terminal device.

If the multicast gateway is deployed in the terminal device, the terminal device supports IP multicast reception in a home network. Each terminal device includes both a multicast gateway and a content playback function, and an application for controlling linear playback is installed in the terminal device. For this implementation model, the multicast gateway function should provide a content service only to a corresponding host terminal device.

A home gateway device may perform only an operation related to multicast group subscription. This operation may lead to unpredictable quality change when a home network does not support full multicast delivery.

Figure 16:
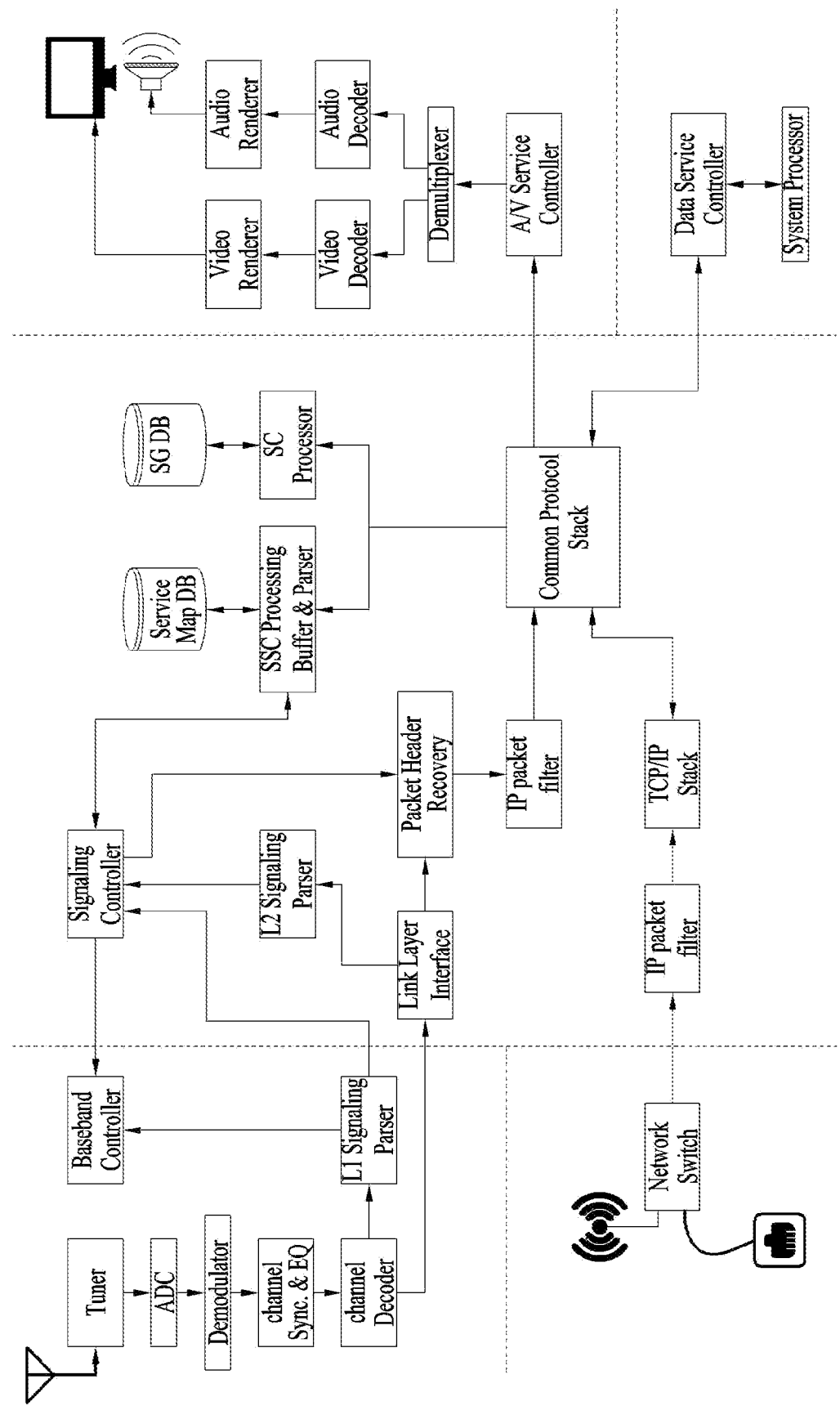
FIG. 16 illustrates a receiver architecture.

FIG. 16 illustrates a receiver architecture.

The apparatuses (FIGS. 2 to 6 and 11 to 15) according to embodiments may be hybrid-coupled to a broadcast receiver as illustrated in FIG. 16.

The broadcast receiver may provide a broadcast service by receiving multicast/unicast-based media.

Meanwhile, the definition of abbreviations related to this document are as follows.

AAC: Advanced Audio Coding, ABR: Adaptive Bit Rate, API: Application Programmer's Interface, BMFF: Base Media File Format, CDN: Content Delivery (Distribution) Network, CMAF: Common Media Application Format, CP: Content Provider, DASH: Dynamic Adaptive Streaming over HTTP, DNS: Domain Name System, DRM: Digital Rights Management, EPG: Electronic Program Guide, IGMP: Internet Group Management Protocol, IP: Internet Protocol, ISO: International Organization for Standardization, HLS: HTTP Live Streaming, HTTP: HyperText Transfer Protocol, HTTPS: Secure HyperText Transfer Protocol, MBMS: Multimedia Broadcast Multicast Services (pertaining to 3GPP), MPD: Media Presentation Description (pertaining to MPEG-DASH), MPEG: Moving Pictures Experts Group, OTT: Over The Top, PES: Packetized Elementary Stream (pertaining to MPEG-2 Transport Stream), PID: Packet Identifier (pertaining to MPEG-2 Transport Stream), QUIC: Quick UDP Internet Connection, RTCP: RTP Control Protocol, RTP: Real-time Delivery protocol, STB: Set-Top Box, TCP: Transmission Control Protocol, UDP: User Datagram Protocol, URL: Uniform Resource Locator (pertaining to HTTP).

The method/apparatus according to embodiments may efficiently obtain a presentation manifest for multicast-to-unicast conversion in an adaptive bitrate multicast system.

A configuration for performing multicast-to-unicast conversion in a player according to embodiments is described below.

Figure 17:
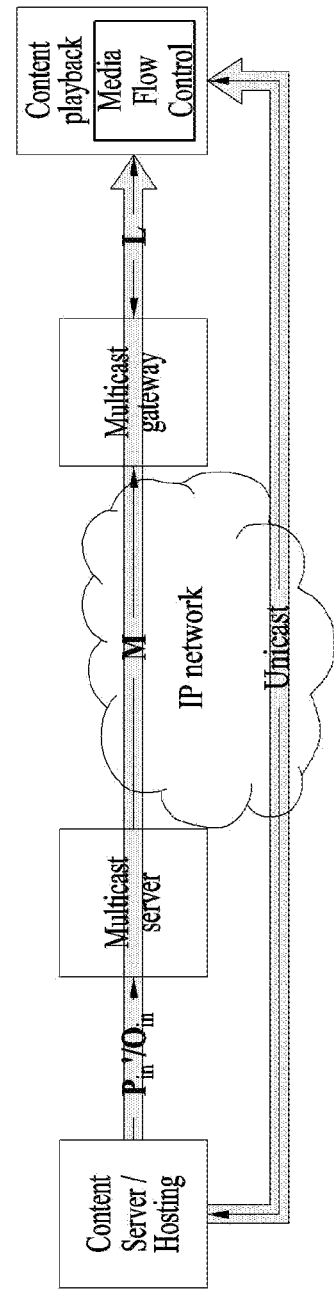
FIG. 17 illustrates a multicast-to-unicast conversion operation according to embodiments.

FIG. 17 illustrates a multicast-to-unicast conversion operation according to embodiments.

Elements of FIG. 17 may be related to corresponding elements of FIGS. 2 to 6 and 11 to 16.

FIG. 17 illustrates the multicast-to-unicast conversion operation performed in a playback function. The apparatus according to embodiments may perform conversion between multicast and unicast based on the following operation(s). The apparatus according to embodiments may be connected to a content server, a multicast server, an IP network, a multicast gateway, and/or a content playback and may effectively perform multicast-to-unicast conversion based on flows according to embodiments.

Media content transmitted through multicast is ingested from the content server/hosting function to the multicast server. The multicast server transmits the same media content (media segment) to a plurality of multicast gateways. The multicast gateway delivers content received through multicast to the content playback function. As an example of multicast transport, in a DVB multicast ABR environment, an interface Pin' or Oin may be used for ingest. An interface M may be used for multicast transport, and an interface L may be used for media transport to the content playback function.

Media content transmitted through unicast is directly transmitted from the content server/hosting function to the content playback function. In this case, the content playback function may directly make a request for unicast content to the content server/hosting function using HTTP(S).

A media flow control subfunction includes a management and control function to provide continuity of corresponding content when the same media content is converted from multicast to unicast or from unicast to multicast. In an embodiment of the above figure, the media flow control subfunction may be included in the content playback function. The media flow control function may be implemented in an independent functional unit or may be implemented as a part of other functions.

Figure 18:
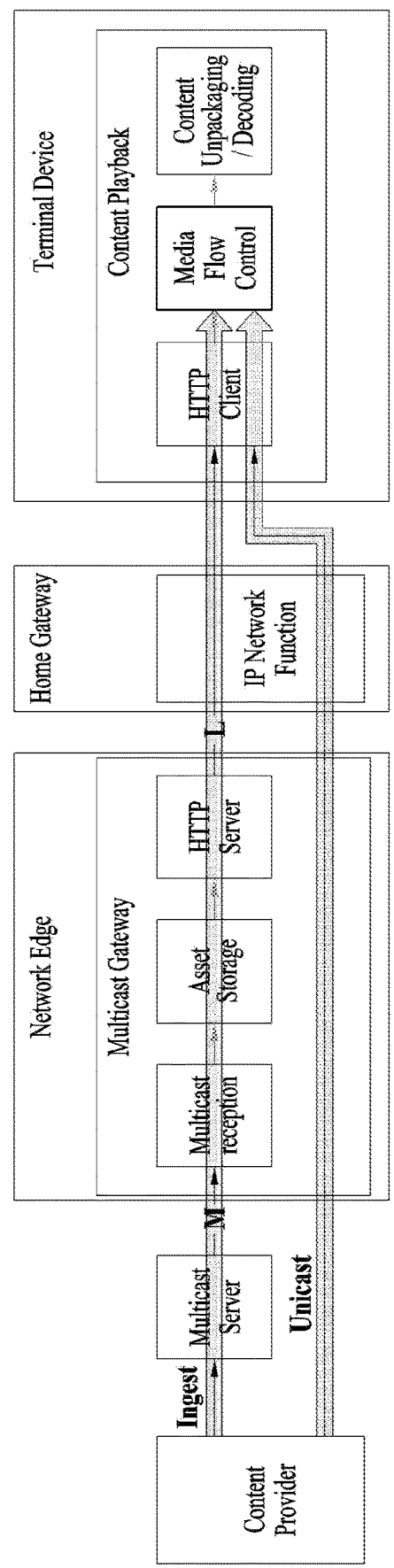
FIG. 18 illustrates a multicast gateway architecture according to embodiments.

FIG. 18 illustrates a multicast gateway architecture according to embodiments.

In FIG. 18, the case in which a multicast gateway is deployed in a network edge device is illustrated.

Figure 19:
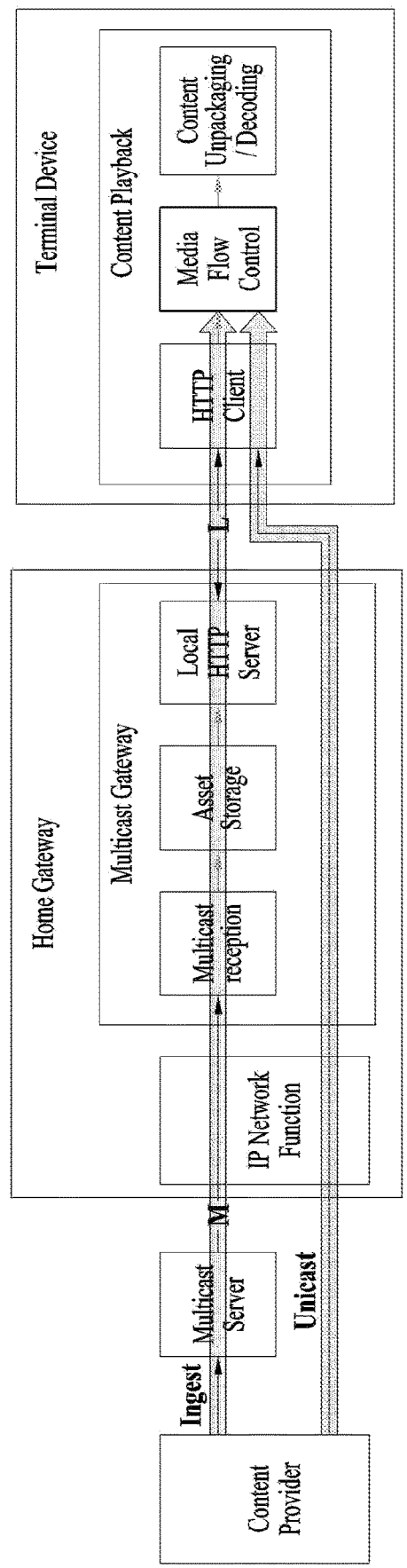
FIG. 19 illustrates a multicast gateway architecture according to embodiments.

FIG. 19 illustrates a multicast gateway architecture according to embodiments.

In FIG. 19, the case in which a multicast gateway is deployed in a home gateway device is illustrated.

Figure 20:
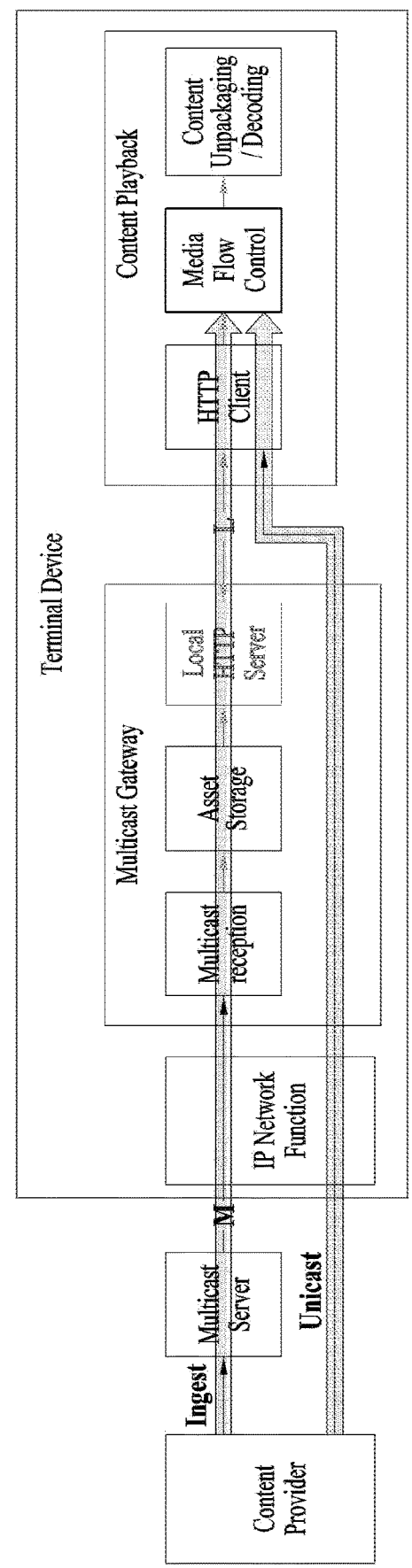
FIG. 20 illustrates a multicast gateway architecture according to embodiments.

FIG. 20 illustrates a multicast gateway architecture according to embodiments.

In FIG. 20, the case in which a multicast gateway is deployed in a terminal device is illustrated.

As illustrated in FIGS. 3 to 5 and 18 to 20, the apparatus according to embodiments may be deployed according to various architectures.

Figure 21:
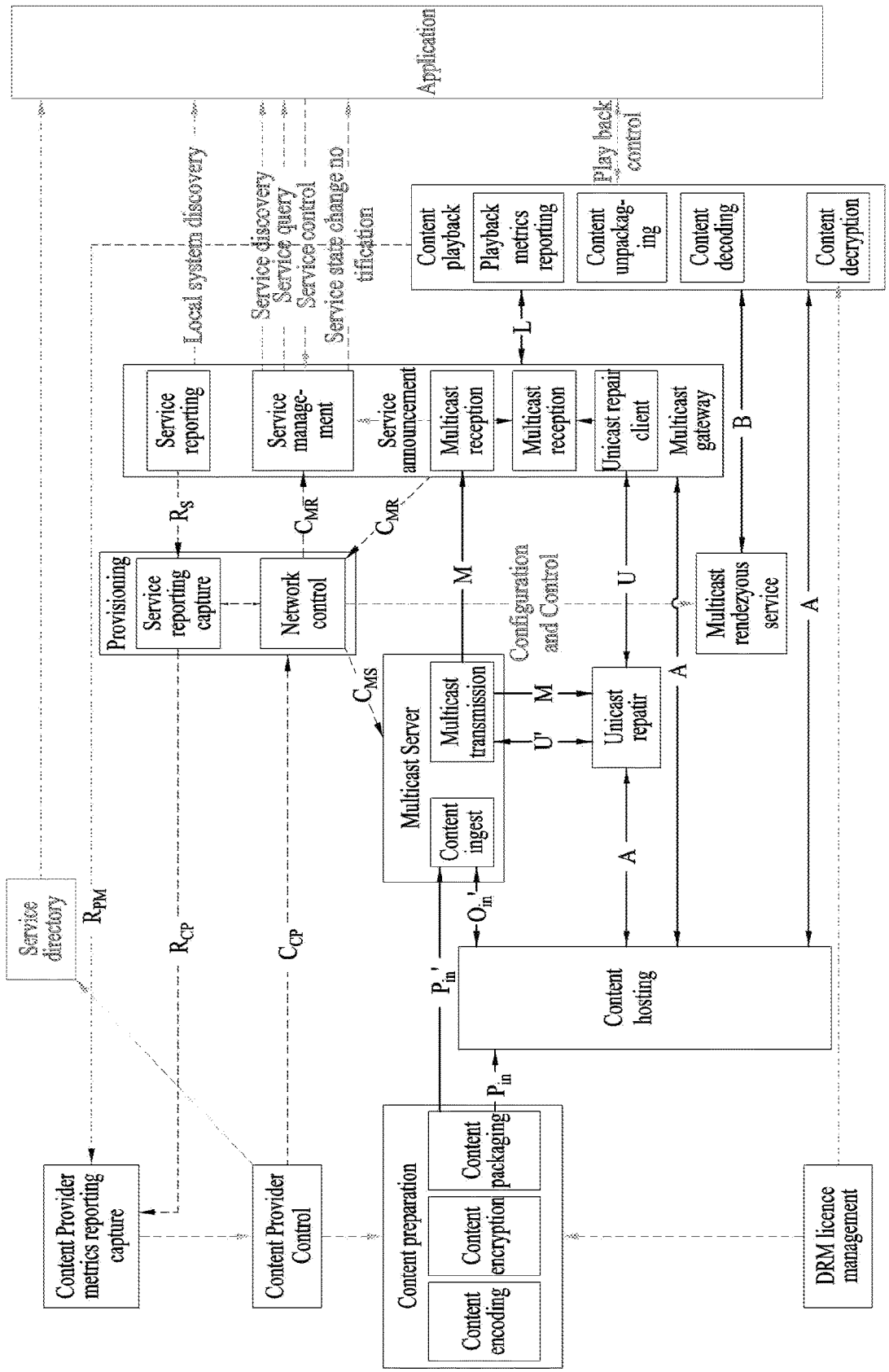
FIG. 21 illustrates a multicast rendezvous service-based operation configuration according to embodiments.

FIG. 21 illustrates a multicast rendezvous service-based operation configuration according to embodiments.

A device architecture according to embodiments as illustrated in FIGS. 6, 11, and 12 is illustrated in FIG. 21, and an operation of acquiring a presentation manifest may be performed using a multicast rendezvous service.

For a manifest architecture (multicast architecture), a content playback function should make a request for content to a multicast gateway in case of multicast reception and should receive content from a content hosting function in case of unicast reception. For this purpose, the content playback function may first access a multicast rendezvous service through a reference point B in order to obtain a presentation manifest for receiving media content, and the multicast rendezvous service may provide a URL capable of appropriately obtaining the presentation manifest according to multicast and unicast to the content playback function.

The apparatus according to embodiments may correspond to or be connected to element(s) of the multicast architecture according to embodiments.

Deployment of Multicast Rendezvous Service

The multicast rendezvous service may be configured with regular deployment and co-located deployment depending on whether HTTP(S) and unidirectional transmission are supported.

The content playback function of the apparatus according to embodiments may obtain manifest URL information and perform configuration through the following operations.

Regular deployment—Case in which the multicast rendezvous service is deployed in a network and managed by a system operator.

Co-located deployment—Case in which the multicast rendezvous service is deployed in the same device as the multicast gateway Regular Deployment The multicast rendezvous service may be deployed in the network and may be managed and controlled by the system operator.

Figure 22:
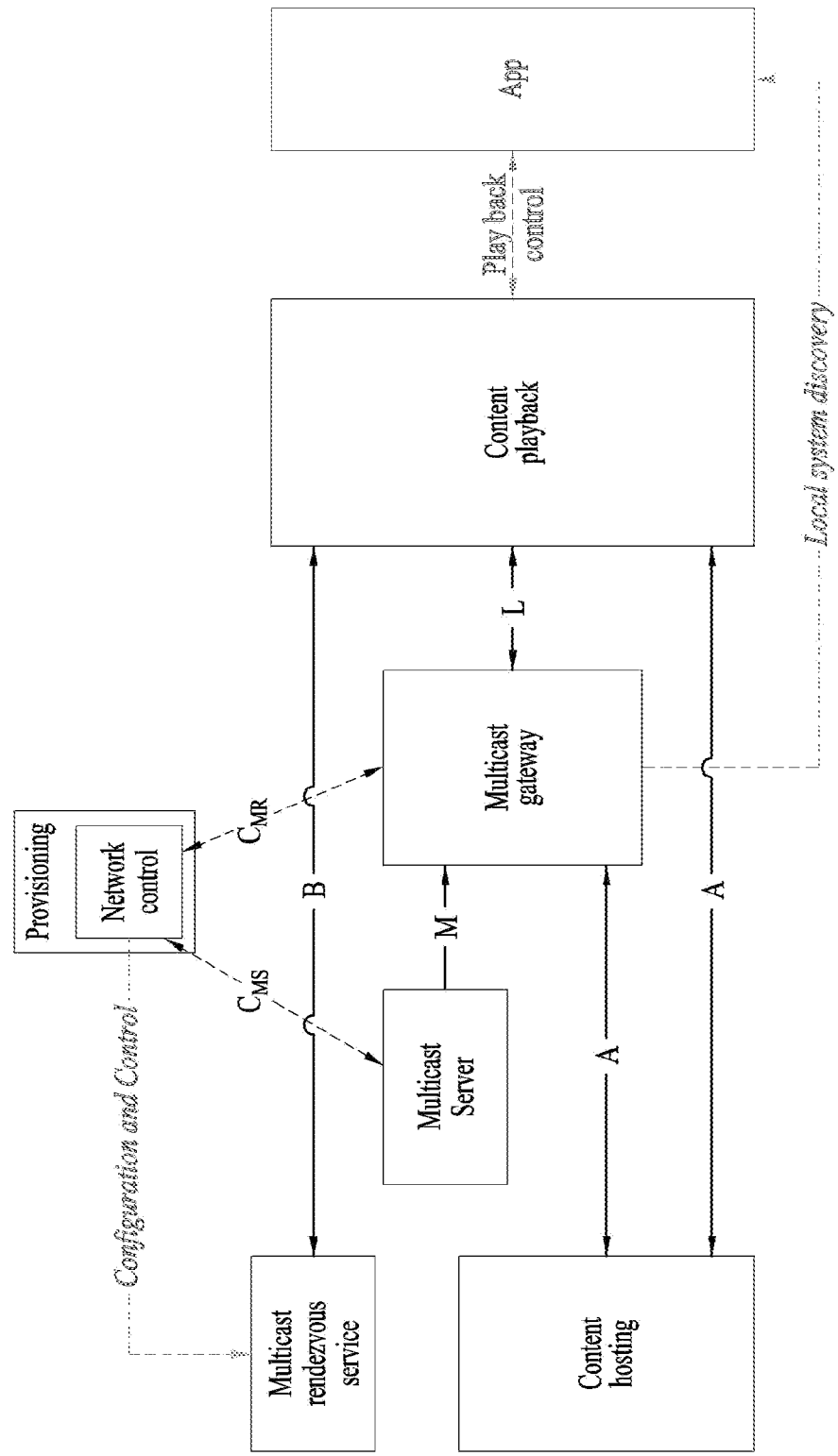
FIG. 22 illustrates a multicast rendezvous service operation according to embodiments.

FIG. 22 illustrates a multicast rendezvous service operation according to embodiments.

In FIG. 22, the multicast rendezvous service operation related to FIGS. 6, 11, 12, and 21 is illustrated.

A content playback function may acquire manifest URL information for receiving content from a multicast rendezvous service through a reference point B upon first accessing content desired to be received. For this purpose, the following configurations may be performed.

A configuration of a set of basic parameters (e.g., an endpoint address of a multicast gateway configuration transport session) may be applied to a multicast gateway. For this configuration, an in-band multicast gateway configuration method may be used.

A configuration of a set of multicast sessions currently provisioned through a reference point CMR or reference points CMS and M may be applied to the multicast gateway. For such a configuration, not only the in-band multicast gateway configuration method but also an out-of-band pushed configuration, an out-of-band pulled configuration, or a just-in-time configuration method may be used.

Co-located Deployment

Co-located deployment corresponds to the case in which the multicast rendezvous service is configured in the same device as the multicast gateway. Co-located deployment may be mainly used when a multicast ABR network is configured with unidirectional deployment.

Figure 23:
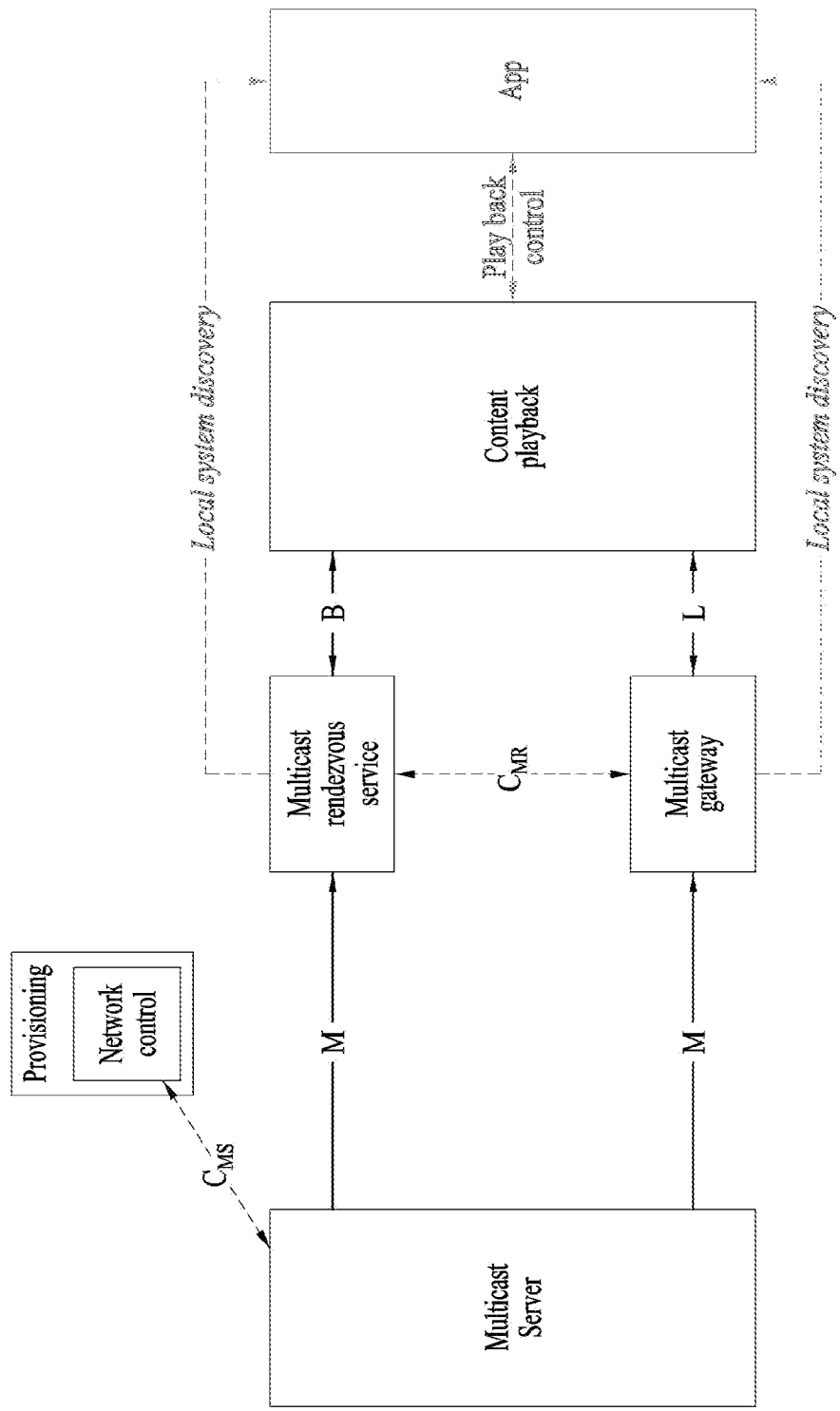
FIG. 23 illustrates a multicast rendezvous service operation according to embodiments.

FIG. 23 illustrates a multicast rendezvous service operation according to embodiments.

In FIG. 23, an architecture in which a multicast rendezvous service is deployed at the same location as a multicast gateway is illustrated.

A content playback function may acquire manifest URL information for receiving content from the multicast rendezvous service through a reference point B upon first accessing content desired to be received. For this purpose, the following configurations may be performed.

A configuration of a set of basic parameters (e.g., an endpoint address of a multicast gateway configuration transport session) may be applied to the multicast rendezvous service.

A configuration of a set of multicast sessions currently provisioned through a reference point M may be applied to the multicast gateway.

In this case, an in-band multicast gateway configuration method may be used for each configuration.

Figure 24:
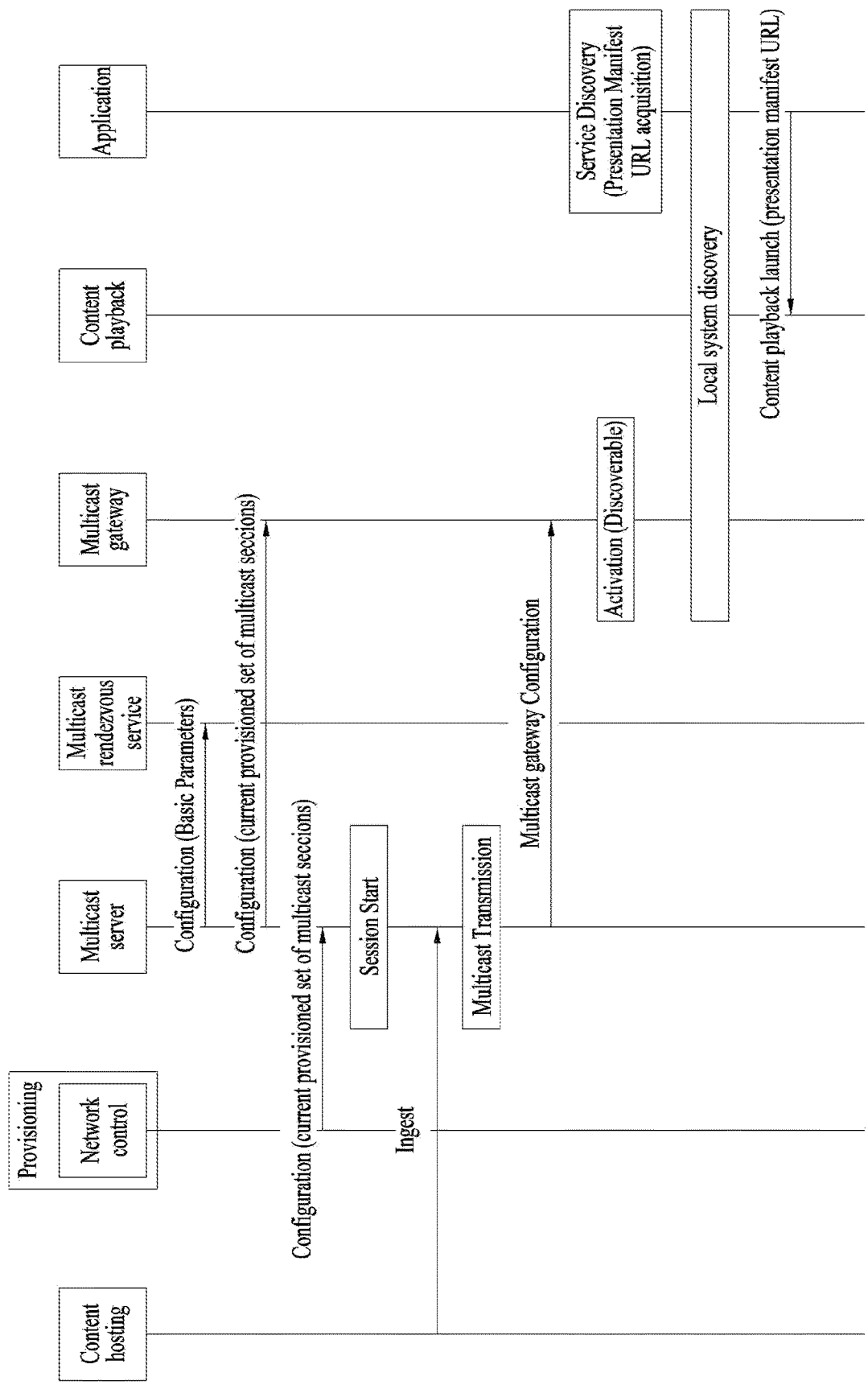
FIGS. 24 and 25 illustrate multicast operation according to embodiments.
Figure 25:
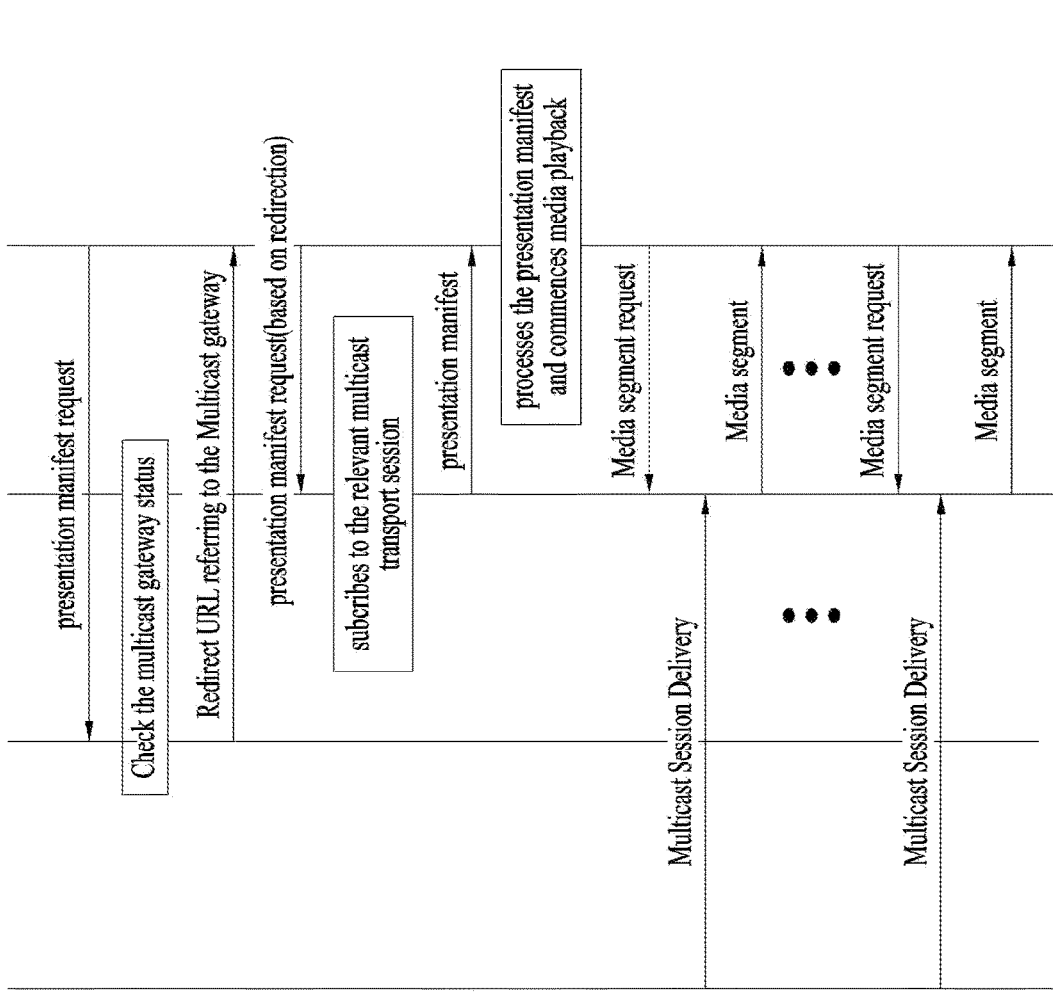

Operations:

Multicast Operation:

FIGS. 24 and 25 illustrate a multicast operation according to embodiments.

In FIGS. 24 and 25, a flow for multicast reception is illustrated. The method/apparatus according to embodiments may receive multicast based on the flow as illustrated in FIG. 24.

If a user selects multicast content to be received, a corresponding application may obtain a URL to request an initial presentation manifest through a service directory. In this case, the URL directs a multicast rendezvous service.

The application controls a content playback function to start a content reception operation. In this case, the application may deliver the URL for the multicast rendezvous service.

The content playback function makes a request for a presentation manifest to the multicast rendezvous service through a reference point B using the URL obtained from the application.

The multicast rendezvous service checks the status of a multicast gateway. If a service for the requested presentation manifest is defined in a multicast configuration, the multicast rendezvous service transmits a redirection URL for the multicast gateway to the content playback function. In this case, a multicast session configuration may be included in the transmitted redirection message.

Upon receiving the redirection message, the content playback function makes a request for the presentation manifest to the multicast gateway according to corresponding redirection.

If the presentation manifest is previously cached in the multicast gateway, the multicast gateway transmits the presentation manifest to the content playback function.

If the presentation manifest is not cached in the multicast gateway, the multicast gateway may retrieve the presentation manifest from a content hosting function through a reference point A and transmits the presentation manifest back to the content playback function.

The content playback function may receive a media segment for corresponding content through the multicast gateway based on the received presentation manifest.

In this operation, the syntax of a request URL of an HTTP message sent by the content playback function to the multicast rendezvous service is as follows.

http[s]://<Host>/<ManifestPath>[?<field>=<value>[&<field>=<value>]*]

Elements included in the URL according to embodiments are as illustrated in FIG. 26.

FIG. 26 illustrates URL elements according to embodiments.

Host: A fully qualified domain name (FQDN) (or IP address) and optionally a port number of a multicast rendezvous service.

Manifest path (ManifestPath): A resource path for retrieving a presentation manifest from a specified host.

Authentication token (AToken): A value of an authentication token that authorizes access to the multicast rendezvous service. If required by a system operator, this value may be included in an original presentation manifest URL. As part of an earlier HTTP redirect URL, this value may be added by a third-party CDN broker. The value may be locally generated by an application.

Multicast status (MGstatus): A value of a current status of a multicast gateway. For example, a value of 0 may indicate an inactive status and a value of 1 may indicate an active status.

Multicast ID (MGid): A value related to a port number of the multicast gateway. This value may be optionally be preceded by an IP address. A format may be the same as [IP address]: port.

Multicast host (MGhost): A value of a multicast gateway host name.

Original (Ori): A host name (FQDN) of an original targeted host. The application may substitute the original targeted host name (FQDN) with a local multicast rendezvous service host name or address. Moreover, in case of relying on a third-party CDN broker, the latter indicates the original targeted host name (FQDN) before redirecting a request to the multicast rendezvous service Upon receiving a request URL, the multicast rendezvous service may transmit a 307 Temporary Redirect response. Here, the syntax of the redirect URL of a location response header is as follows.

http[s]://<Host>[/session ID]/<ManifestPath> [?conf=<multicast session parameters>]

Elements included in the URL according to embodiments are as illustrated in FIG. 27.

FIG. 27 illustrates URL elements according to embodiments.

Host: A port number, for example, "router.example:8088" or "192.0.2.1:8088" or an IP address or an FQDN of a multicast gateway.

Session ID: A unique presentation session identifier that is generated or communicated by a multicast rendezvous service including one or more URL path elements.

Manifest path (ManifestPath): A resource path for retrieving a presentation manifest from a specified host.

Configuration (conf): Multicast session parameters may take the form of a multicast gateway configuration instance document including one multicast session. The document may be compressed using gzip and base64url encoded prior to inclusion as a URL query string parameter.

In this case, if the presentation manifest is related to a multicast session in a multicast session configuration (service may be transmitted through multicast), the multicast rendezvous service may redirect the request to the multicast gateway as follows.

HTTP/1.1 307 Temporary Redirect
 Server: <Multicast gateway>
 Location: http[s]://<Multicast gateway>/<ManifestPath>

A URL corresponding to a location field of an HTTP header may include a session identifier, and a query parameter for piggybacking the multicast gateway configuration instance document including a multicast session corresponding to a requested presentation manifest.

Figure 28:
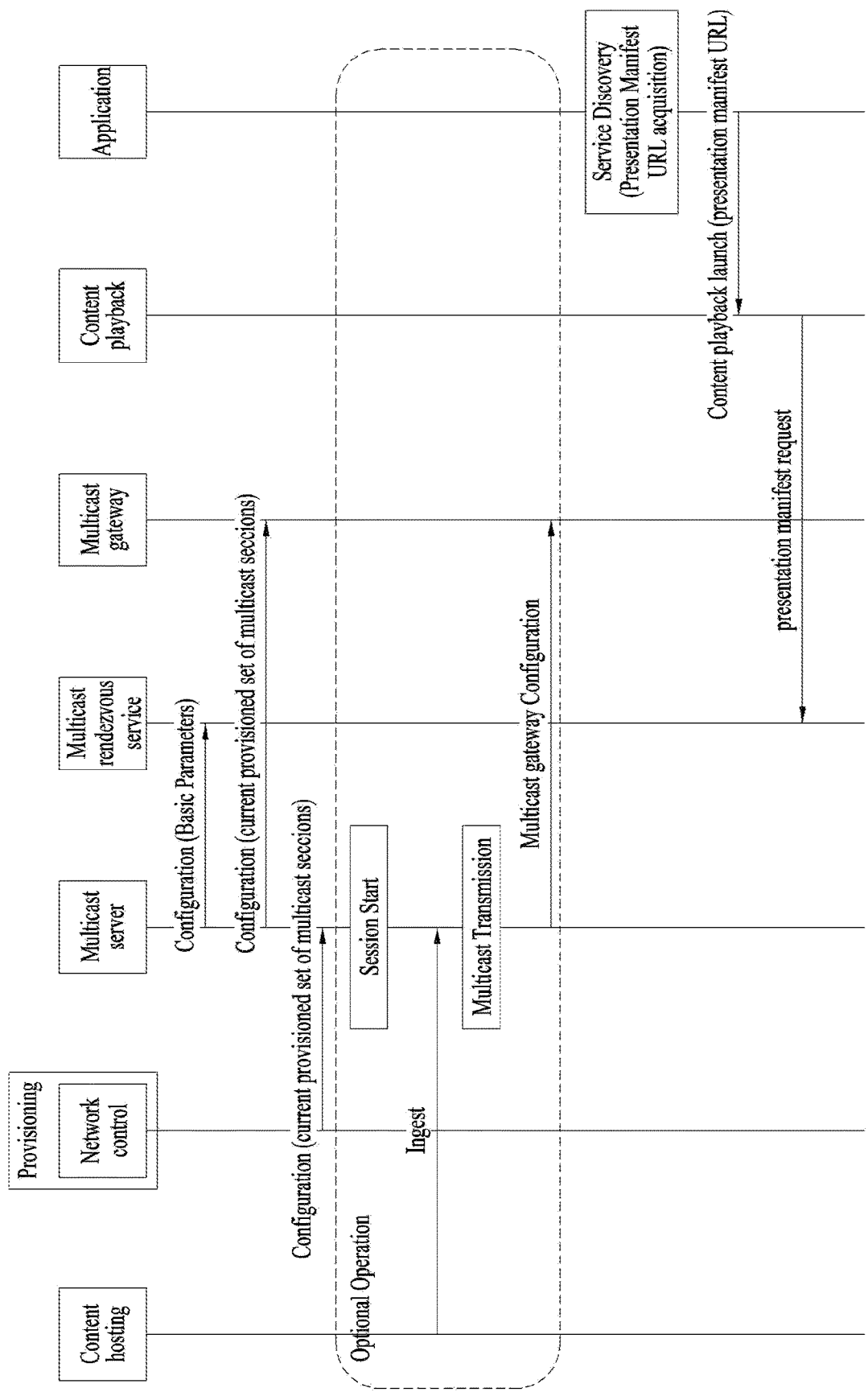
FIGS. 28 and 29 illustrate a unicast operation according to embodiments.
Figure 29:
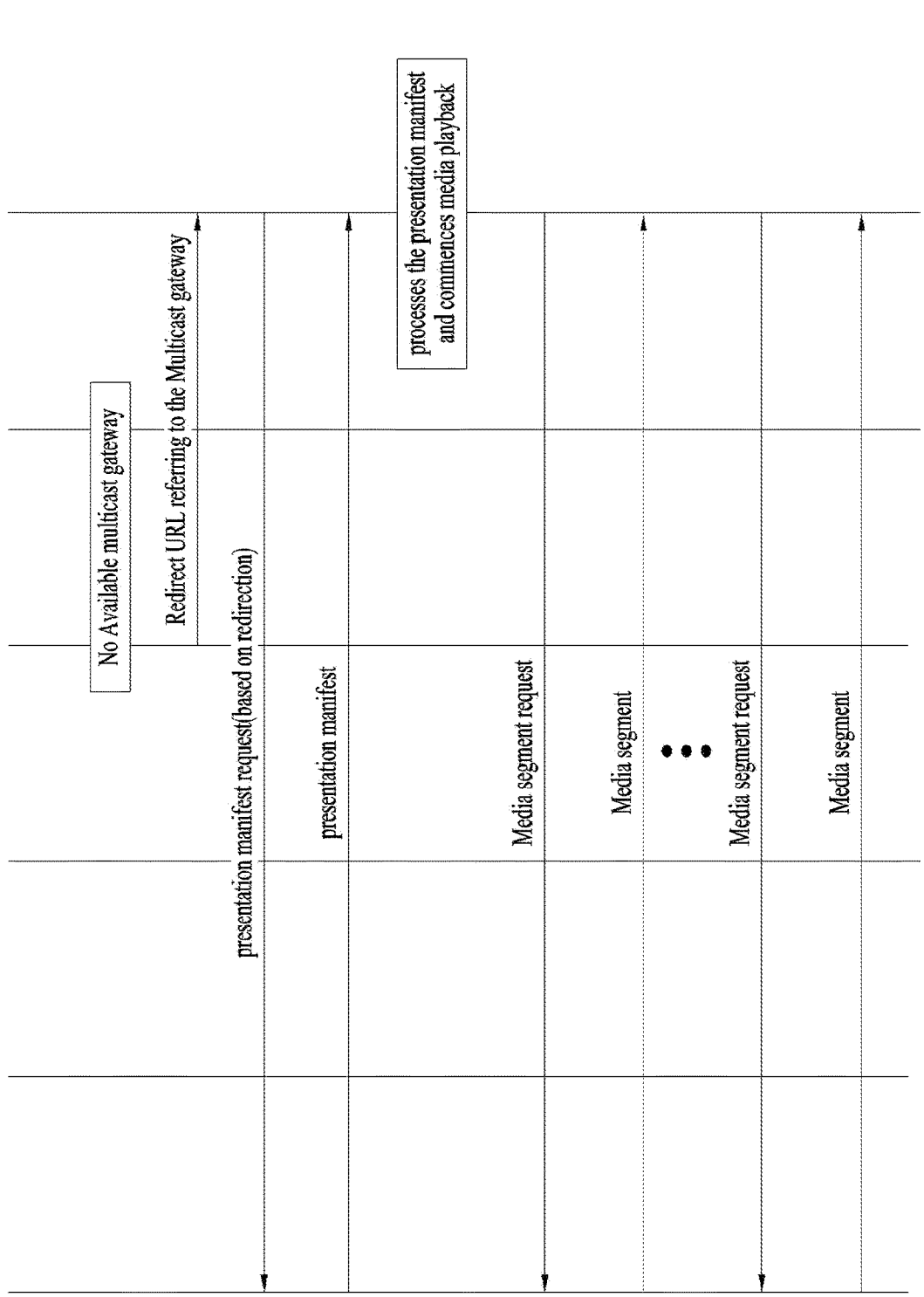

FIGS. 28 and 29 illustrate a unicast operation according to embodiments.

The method/apparatus according to embodiments may receive unicast media based on the flow of FIGS. 28 and 29.

If a user selects multicast content to be received, a corresponding application may obtain a URL to request an initial presentation manifest through a service directory. In this case, the URL directs a multicast rendezvous service.

The application controls a content playback function to start a content reception operation. In this case, the application may deliver the URL for the multicast rendezvous service.

The content playback function make a request for a presentation manifest to the multicast rendezvous service through a reference point B using the URL obtained from the application.

The multicast rendezvous service checks the status of a multicast gateway. If a service for the requested presentation manifest is defined not in a multicast configuration but in a unicast configuration, the multicast rendezvous service transmits a redirection URL for a content hosting function to the content playback function. In this case, a unicast session configuration may be included in the transmitted redirection message.

Upon receiving the redirection message, the content playback function makes a request for the presentation manifest to the content hosting function according to corresponding redirection.

The content playback function may receive a media segment for corresponding content from the content hosting function based on the received presentation manifest.

In this operation, the syntax of a request URL of an HTTP message that the content playback function sends to the multicast rendezvous service may be configured equally to the syntax as in the case of multicast as follows.

http[s]://<Host>/<ManifestPath>[?<field>=<value> [&<field>=<value>]*]

Upon receiving the request URL, the multicast rendezvous service may send a 307 Temporary Redirect response. Here, the syntax of a redirect URL of a location response header is as follows. In this case, the same syntax as the syntax of multicast may be used, and a <Host>element indicates a content hosting function.

http[s]://<Host>[/session ID]/<ManifestPath> [?conf=<multicast session parameters>]

Elements included in the URL are as illustrated in FIG. 30.

FIG. 30 illustrates URL elements according to embodiments.

Host: A port number, for example, "0", or an IP address or an FQDN of a content hosting function.

Session ID: The session ID is a unique presentation session identifier that is generated or communicated by a multicast rendezvous service including one or more URL path elements.

Manifest path (ManifestPath): A resource path for retrieving a presentation manifest from a specified host.

In this case, if the presentation manifest is not related to a multicast session in a multicast session configuration (service is transmitted through unicast), the multicast rendezvous service may redirect a request to the content hosting function as follows.

HTTP/1.1 307 Temporary Redirect
 Server: <Content hosting>
 Location: http [s]://<Content hosting>/<ManifestPath>

Figure 31:
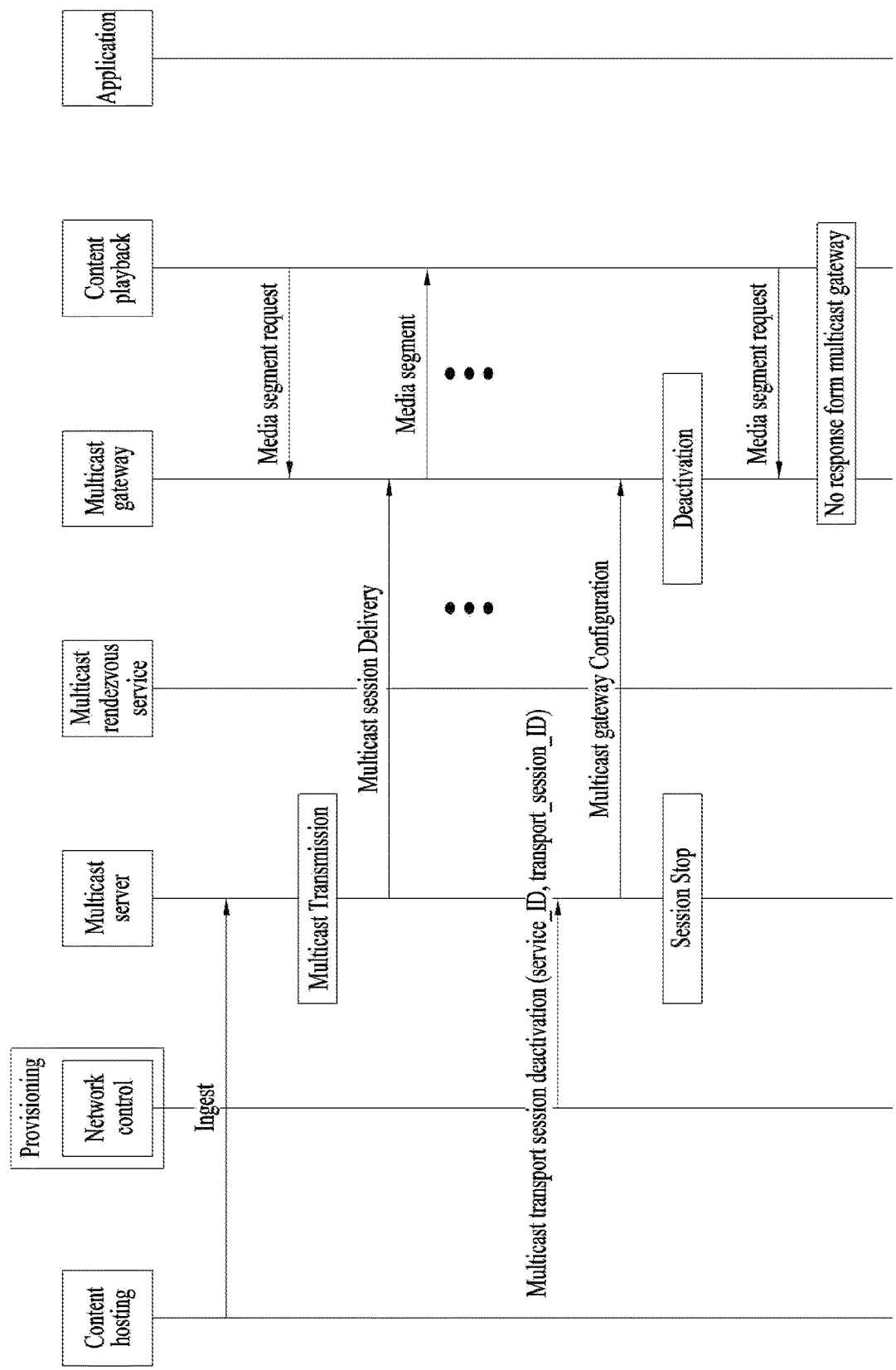
FIGS. 31 and 32 illustrate multicast-to-unicast conversion according to embodiments.
Figure 32:
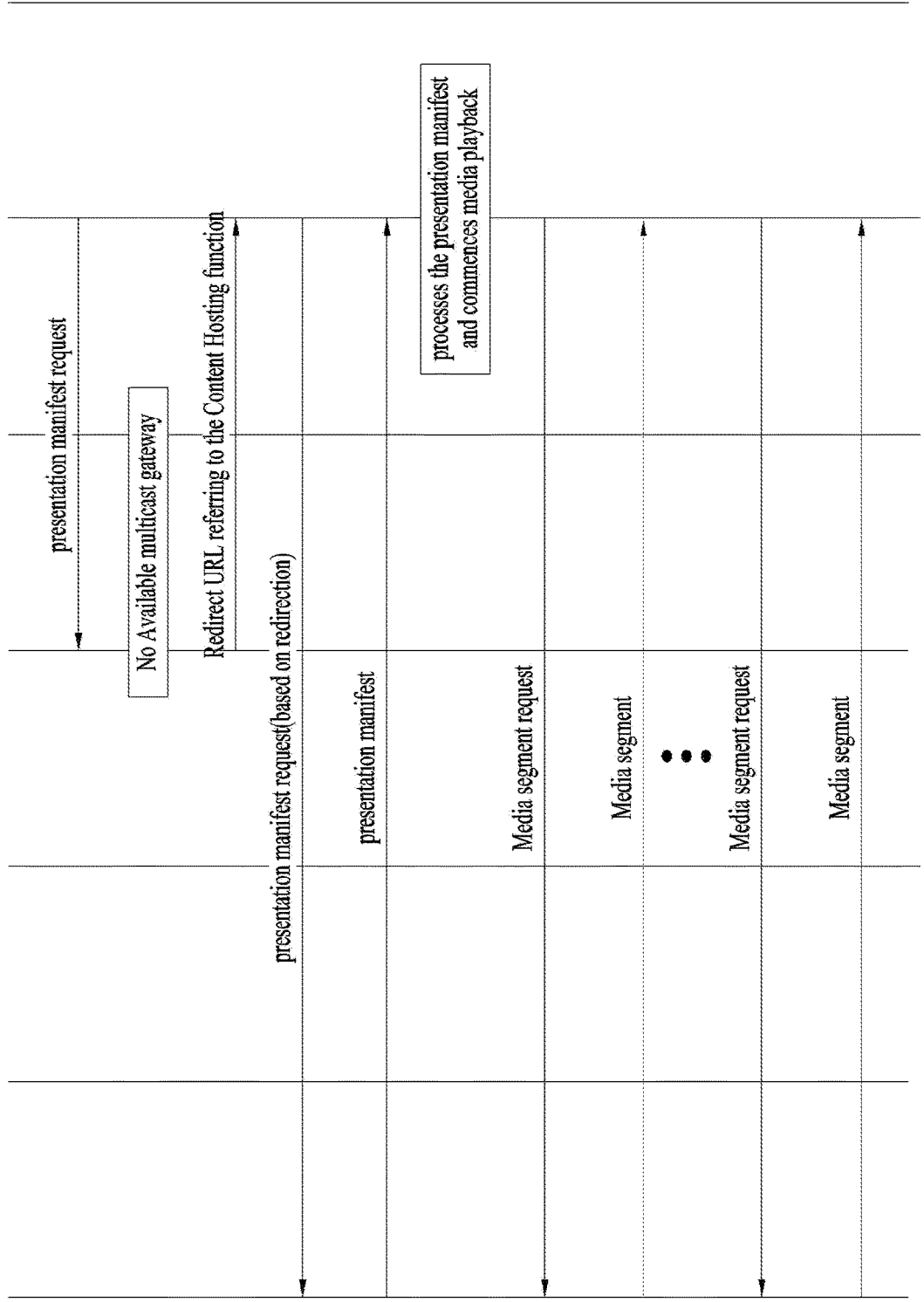

FIGS. 31 and 32 indicate multicast-to-unicast conversion according to embodiments.

Multicast-to-Unicast Conversion

A process of conversion to unicast during multicast reception is illustrated in FIGS. 31 and 32. The apparatus according to embodiments may perform multicast-to-unicast conversion based on the flow illustrated in FIGS. 31 and 32.

If a user selects multicast content to be received, a corresponding application may obtain a URL to request an initial presentation manifest through a service directory. In this case, the URL directs a multicast rendezvous service.

The application controls a content playback function to start a content reception operation. In this case, the application may deliver the URL for the multicast rendezvous service.

The content playback function makes a request for a presentation manifest to the multicast rendezvous service through a reference point B using the URL obtained from the application.

The multicast rendezvous service checks the status of a multicast gateway. If a service for the requested presentation manifest is defined not in a multicast configuration but in a unicast configuration, the multicast rendezvous service transmits a redirection URL for a content hosting function to the content playback function. In this case, a unicast session configuration may be included in the transmitted redirection message.

Upon receiving the redirection message, the content playback function makes a request for the presentation manifest to the content hosting function according to corresponding redirection.

The content playback function receives a media segment for corresponding content from the multicast gateway based on the presentation manifest for multicast delivery.

A network control function transmits a multicast transport session deactivation message to a multicast server to stop a multicast session.

The multicast server indicates that the multicast transport session is stopped through a multicast gateway configuration, and the multicast gateway does not deliver the media segment requested by the content playback function any longer.

If there is no response from the multicast gateway for a certain period of time (timeout), the content playback function makes a request for a presentation manifest to the first multicast rendezvous service. In this case, the content playback function may provide information about the multicast transport session that has been previously received.

The multicast rendezvous service checks service and multicast transport session information for the requested presentation manifest. If the corresponding session is defined in a unicast configuration, the multicast rendezvous service transmits a redirection URL for the content hosting function to the content playback function. In this case, the unicast session configuration for the service may be included in the transmitted redirection message.

Upon receiving the redirection message, the content playback function makes a request for a presentation manifest to the content hosting function according to the redirection.

In this operation, the syntax of the request URL of an HTTP message sent by the content playback function to the multicast rendezvous service is as follows.

http[s]://<Host>/<ManifestPath>[?<field>=<value>[&<field>=<value>]*]

Elements included in the URL are as illustrated in FIG. 33.

FIG. 33 illustrates URL elements according to embodiments.

For a description of elements of FIG. 33 corresponding to the elements of FIG. 26, reference may be made to a description of FIG. 26.

Request Option: A value related to the reason for a current request. For example, the request operation of 1 indicates an initial request, and the request operation of 1 indicates multicast-to-unicast conversion.

Service ID: The service ID is delivered from a multicast gateway. This field may be used when the request option is 1.

Multicast Transport Session ID (MulticastTransportSessionID): The multicast transport session ID is delivered from the multicast gateway. This field may be used when the request option is 1.

The apparatus and the method according to embodiments may efficiently perform multicast reception, unicast reception, and multicast-to-unicast conversion while efficiently using network resources based on the architectures, flows, and/or elements described in this document.

Figure 34:
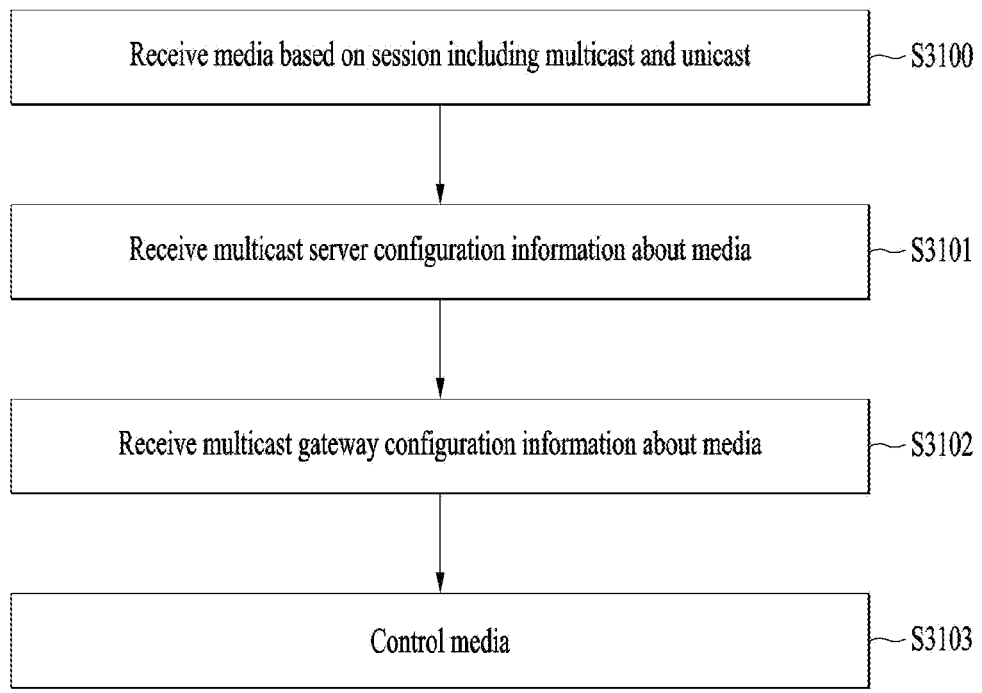
FIG. 34 illustrates a media processing method according to embodiments.

FIG. 34 illustrates a media processing method according to embodiments.

The media processing method according to embodiments may include receiving media based on a session including multicast and unicast (S3100). The reception operation according to embodiments may include operations based on the flowchart of FIG. 1, the architectures of FIGS. 2 to 6, FIGS. 11 to 16, and FIGS. 17 to 23, and the flowcharts of FIGS. 24 and 25, FIGS. 25 to 29, and FIGS. 31 and 32.

The media processing method according to embodiments may further include receiving multicast server configuration information about the media (S3101). The media processing method according to embodiments may further include receiving multicast gateway configuration information about the media (S3102).

The method/apparatus according to embodiments may play back the media based on reception of configuration information according to embodiments including the multicast server configuration information and/or the multicast gateway configuration information. The configuration information according to embodiments may include the information of FIGS. 7, 8, 9, 10, 26, 27, 30, and 33.

The media processing method according to embodiments may further include controlling the media (S3103). The control operation according to embodiments may include a media provision flow based on a session of the flowchart of FIG. 1, the architectures of FIGS. 2 to 6, FIGS. 11 to 16, FIGS. 17 to 23, and the flowcharts of FIGS. 24 and 25, FIGS. 28 and 29, and 31 and 32.

A media processing apparatus according to embodiments may include a memory; and a processor connected to the memory. The processor may receive media based on a session including multicast and unicast, receive multicast server configuration information about the media, receive multicast gateway configuration information about the media, and control the media (refer to FIGS. 2, 3, 4, and 5).

The multicast server configuration information according to embodiments may include information indicating conversion of the session, information about a multicast session, and information about a unicast session (see FIG. 7).

The information indicating the conversion of the session according to embodiments may indicate that the multicast session is converted to the unicast session, and the information about the unicast session may include information about the converted unicast session (see FIG. 7).

The multicast gateway configuration information about the media according to embodiments may include information indicating conversion of the session, information about a multicast session, and information about a unicast session (refer to FIG. 8).

The information indicating the conversion of the session according to embodiments may indicate that the multicast session is converted to the unicast session, and the information about the unicast session may include information about the converted unicast session (see FIG. 8).

The information about the multicast session according to embodiments may include information indicating a start time for unicast transport for the media, and the information about the unicast session may include ID information for identifying a service related to the unicast session, address information of a presentation manifest for the service related to the unicast session, and information about unicast session reporting parameters (refer to FIGS. 9 and 10).

The processor according to embodiments may be connected to a playback device that plays back the media based on an interface, and the playback device may receive presentation manifest information for receiving the media for a multicast session and a unicast session (refer to FIG. 21).

When the media for the unicast session according to embodiments is delivered, the playback device may receive host information, and the host information may include address information about a content host (refer to FIG. 30).

When the multicast session is converted to the unicast session according to embodiments, the playback device may generate information indicating multicast-to-unicast conversion, information for identifying a service processed by the processor, and information for identifying a multicast transport session processed by the processor.

A media processing method according to embodiments may include: receiving media based on a session including multicast and unicast; receiving multicast server configuration information about the media; receiving multicast gateway configuration information about the media; and controlling the media.

The media processing method according to embodiments may further include receiving presentation manifest information for receiving the media for a multicast session and a unicast session.

The media processing method according to embodiments may further include receiving host information when media for the unicast session is delivered, and the host information may include address information about a content host.

The media processing method according to embodiments may further include generating information indicating multicast-to-unicast conversion, information for identifying a service processed by the processor, and information for identifying a multicast transport session, when the multicast session is converted to the unicast session.

A multicast transport method transmits the same content to a plurality of clients so that network resources may be efficiently used. However, when the consumption of content is small, unicast transport may efficiently use the network resources. To this end, a dynamic multicast-to-unicast conversion method is provided in an existing adaptive bitrate multicast environment, thereby enabling more efficient use of the network resources compared to a single transmission method of multicast and unicast.

While embodiments have been described in terms of the method and/or the apparatus, the description of the method and the description of the apparatus may be complementally applied to each other.

Although embodiments have been explained with reference to each of the accompanying drawings for convenience of description, it is possible to design new embodiments by merging the embodiments illustrated in the accompanying drawings. As needed by those skilled in the art, if a computer-readable recording medium in which programs for executing the embodiments mentioned in the foregoing description are recorded is designed, this may also be within the scope of embodiments. The apparatus and method according to embodiments are not limited by the configurations and methods of the embodiments described above. The embodiments described above may be configured by being selectively combined with one another entirely or in part to enable various modifications. Although the exemplary embodiments have been disclosed for illustrative purposes, those skilled in the art will appreciate that various modifications are possible, without departing from the gist of embodiments as claimed in the accompanying claims. Such modifications should not be understood individually from the technical spirit or prospect of the embodiments.

Various elements of the apparatus of embodiments may be implemented by hardware, software, firmware, or a combination thereof. Various elements of embodiments may be implemented by a single chip, for example, a single hardware circuit. According to embodiments, elements according to embodiments may be implemented as separate chips, respectively. According to embodiments, at least one or more of elements of the apparatus according to embodiments may include one or more processors capable of executing one or more programs. The one or more programs may perform any one or more of the operations/methods according to embodiments or include instructions for performing the same. Executable instructions for performing the methods/operations of the apparatus according to embodiments may be stored in a non-transitory CRM or other computer program products configured to be executed by one or more processors or may be stored in a transitory CRM or other computer program products configured to be executed by one or more processors. In addition, a memory according to embodiments may be used as a concept covering not only volatile memories (e.g., RAM) but also non-volatile memories, flash memories, and PROMs. In addition, the memory may also be implemented in the form of a carrier wave, such as transmission over the Internet. A processor-readable recording medium may be distributed to computer systems connected over a network such that processor-readable code may be stored and executed in a distributed fashion.

In this document, the terms "/" and "," are interpreted as indicating "and/or." For instance, the expression "A/B" may mean "A and/or B.", and "A, B" may mean "A and/or B." Further, "A/B/C" may mean "at least one of A, B, and/or C." "A, B, C" may also mean "at least one of A, B, and/or C." Further, in the document, the term "or" is interpreted as "and/or." For instance, the expression "A or B" may mean 1) only A, 2) only B, or 3) both A and B. In other words, the term "or" in this document may mean "additionally or alternatively."

Terms such as first and second may be used to describe various elements of embodiments. However, various elements according to embodiments should not be limited by the above terms. These terms are only used to distinguish one element from another. For example, a first user input signal may be referred to as a second user input signal. Similarly, a second user input signal may be referred to as a first user input signal. Use of these terms should be construed as not departing from the scope of various embodiments. The first user input signal and the second user input signal are both user input signals but do not mean the same user input signal unless context clearly dictates otherwise.

The terminology used to describe the embodiments is used for the purpose of describing particular embodiments only and is not intended to be limiting of the embodiments. As used in the description of the embodiments and in the claims, the singular forms include plural referents unless the context clearly dictates otherwise. The expression "and/or" is used to include all possible combinations of terms. The terms such as "includes" or "has" are intended to indicate existence of features, numbers, steps, elements, and/or components and should be understood as not precluding possibility of existence of additional existence of features, numbers, steps, elements, and/or components. Conditional expressions, such as "if" and "when", used to explain embodiments are not limited to an optional case and are intended to be interpreted, when a specific condition is satisfied, to perform a related operation or interpret related definition according to the specific condition.

Operations according to embodiments described in this document may be performed by a transmission/reception device including a memory and/or a processor according to embodiments. The memory may store programs for processing/controlling operations according to embodiments, and the processor may control various operations described in this document. The processor may be referred to as a controller or the like. In embodiments, operations may be performed by firmware, software, and/or a combination thereof. The firmware, software, and/or combination thereof may be stored in the processor or the memory.

The operations according to the above-described embodiments may be performed by the transmission device and/or the reception device according to embodiments. The transmission/reception device may include a transmitter/receiver configured to transmit and receive media data, a memory configured to store instructions (program code, algorithms, flowcharts, and/or data) for processes according to embodiments, and a processor configured to control the operations of the transmission/reception device.

The processor may be referred to as a controller or the like and may correspond to, for example, hardware, software, and/or a combination thereof. The operations according to the above-described embodiments may be performed by the processor. In addition, the processor may be implemented as an encoder/decoder for the operations of the above-described embodiments.

Mode for carrying out the disclosure has been described in the best mode for carrying out the disclosure.

The present disclosure is usable in a broadcast and video signal processing field and has industrial applicability with repeatability.

The invention claimed is:

1. A media processing apparatus, comprising:
a memory; and
a processor connected to the memory,
wherein the processor is configured to receive media based on a session including multicast and unicast, receive multicast server configuration information about the media, receive multicast gateway configuration information about the media, and control the media,
wherein the multicast server configuration information includes ready information indicating conversion of the session, information about a multicast session, and information about a unicast session,
wherein the ready information indicates that conversion to the unicast session is ready,
wherein the information about the unicast session includes a service identifier for the unicast session is associated, address information of a presentation manifest for the unicast session, and unicast session reporting parameters,
wherein the multicast server configuration information is received before the conversion of the session,
wherein the information about a multicast session includes session conversion start time information for representing a start time of unicast transport and the multicast session is terminated.

2. The media processing apparatus of claim 1,
wherein the multicast gateway configuration information about the media includes information indicating conversion of the session, information about a multicast session, and information about a unicast session.

3. The media processing apparatus of claim 2,
wherein the information indicating the conversion of the session indicates that the multicast session is converted to the unicast session, and
wherein the information about the unicast session includes information about the converted unicast session.

4. The media processing apparatus of claim 2,
wherein the information about the unicast session includes ID information for identifying a service related to the unicast session, address information of a presentation manifest for the service related to the unicast session, and information about unicast session reporting parameters.

5. The media processing apparatus of claim 1,
wherein the processor is connected to a playback device that plays back the media based on an interface, and
wherein the playback device receives presentation manifest information for receiving the media for a multicast session and a unicast session.

6. The media processing apparatus of claim 5,
wherein the playback device receives host information based on the media for the unicast session being delivered, and
wherein the host information includes address information about a content host.

7. The media processing apparatus of claim 5,
wherein the playback device generates information indicating multicast-to-unicast conversion, information for identifying a service processed by the processor, and information for identifying a multicast transport session processed by the processor, based on the multicast session being converted to the unicast session.

8. A media processing method by an apparatus, comprising:
receiving media based on a session including multicast and unicast;
receiving multicast server configuration information about the media;
receiving multicast gateway configuration information about the media; and
controlling the media,
wherein the multicast server configuration information includes ready information indicating conversion of the session, information about a multicast session, and information about a unicast session,
wherein the ready information indicates that conversion to the unicast session is ready,
wherein the information about the unicast session includes a service identifier for the unicast session is associated, address information of a presentation manifest for the unicast session, and unicast session reporting parameters,
wherein the multicast server configuration information is received before the conversion of the session,
wherein the information about a multicast session includes session conversion start time information for representing a start time of unicast transport and the multicast session is terminated.

9. The media processing method of claim 8,
wherein the multicast gateway configuration information about the media includes information indicating conversion of the session, information about a multicast session, and information about a unicast session.

10. The media processing method of claim 9,
wherein the information indicating the conversion of the session indicates that the multicast session is converted to the unicast session, and
wherein the information about the unicast session includes information about the converted unicast session.

11. The media processing method of claim 9,
wherein the information about the unicast session includes ID information for identifying a service related to the unicast session, address information of a presentation manifest for the service related to the unicast session, and information about unicast session reporting parameters.

12. The media processing method of claim 8, further comprising
   receiving presentation manifest information for receiving the media for a multicast session and a unicast session.

13. The media processing method of claim 12, further comprising
   receiving host information based on the media for the unicast session being delivered,
   wherein the host information includes address information about a content host.

14. The media processing method of claim 12, further comprising:
   generating information indicating multicast-to-unicast conversion, information for identifying a service processed by a processor and information for identifying a multicast transport session, based on the multicast session being converted to the unicast session.

\* \* \* \* \*